(12) United States Patent
Chapman et al.

(10) Patent No.: US 8,303,758 B2
(45) Date of Patent: Nov. 6, 2012

(54) METHODS FOR MANUFACTURING COMPOSITE SECTIONS FOR AIRCRAFT FUSELAGES AND OTHER STRUCTURES

(75) Inventors: Michael R. Chapman, Seattle, WA (US); Robert M. Watson, Seattle, WA (US); Donald A. Anderson, Seattle, WA (US); Marc J. Piehl, Seattle, WA (US); Joseph L. Sweetin, Seattle, WA (US); Douglas L. Grose, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/436,631

(22) Filed: Mar. 30, 2012

(65) Prior Publication Data
US 2012/0180942 A1 Jul. 19, 2012

Related U.S. Application Data

(62) Division of application No. 12/367,479, filed on Feb. 6, 2009, now Pat. No. 8,168,023, which is a division of application No. 10/996,922, filed on Nov. 24, 2004, now Pat. No. 7,503,368.

(51) Int. Cl.
*B29C 65/00* (2006.01)
*B32B 37/00* (2006.01)
(52) U.S. Cl. ........ 156/287; 156/173; 156/187; 156/188; 156/195; 156/285
(58) Field of Classification Search .................. 156/166, 156/169, 173, 184, 187, 188, 195, 285, 287; 264/101, 102
See application file for complete search history.

(56) References Cited

U.S. PATENT DOCUMENTS

| | | | |
|---|---|---|---|
| 2,004 A | 3/1841 | Hunter et al. |
| 1,976,257 A | 10/1934 | Harper, Jr. |
| 2,292,372 A | 8/1942 | Gerlach et al. |
| 2,367,750 A | 1/1945 | Berkow et al. |
| 2,387,219 A | 10/1945 | Wallis |
| 2,992,711 A | 7/1961 | Mitchell et al. |
| 3,071,217 A | 1/1963 | Gould |

(Continued)

FOREIGN PATENT DOCUMENTS
DE 3040838 A1 5/1982
(Continued)

OTHER PUBLICATIONS

PCT search report dated May 25, 2005 regarding application No. PCT/US2004/039905, 3 PAGES.

(Continued)

*Primary Examiner* — Khanh P Nguyen
*Assistant Examiner* — Carson Gross
(74) *Attorney, Agent, or Firm* — Yee & Associates, P.C.

(57) ABSTRACT

Methods for manufacturing composite sections for aircraft fuselages and other structures are disclosed herein. A method for manufacturing a shell structure in accordance with one embodiment of the invention includes applying composite material to an interior mold surface of a tool to form a skin extending 360 degrees around an axis. The method can further include positioning a plurality of stiffeners on an inner surface of the skin. After the stiffeners have been positioned, a vacuum bag can be installed over the stiffeners and evacuated to press the stiffeners and the skin outwardly against the interior mold surface of the tool. Next, the skin/stiffener combination can be cocured to bond the stiffeners to the skin and harden the shell structure.

10 Claims, 18 Drawing Sheets

U.S. PATENT DOCUMENTS

| | | |
|---|---|---|
| 3,271,917 A | 9/1966 | Rubenstein |
| 3,306,797 A | 2/1967 | Boggs |
| 3,452,501 A | 7/1969 | Zimmer et al. |
| 3,490,983 A | 1/1970 | Lee |
| 3,507,634 A | 4/1970 | O'Driscoll |
| 3,603,096 A | 9/1971 | Wells |
| 3,879,245 A | 4/1975 | Fetherston et al. |
| 3,974,313 A | 8/1976 | James |
| 3,976,269 A | 8/1976 | Gupta |
| 3,995,080 A | 11/1976 | Cogburn et al. |
| 4,064,534 A | 12/1977 | Chen et al. |
| 4,086,378 A | 4/1978 | Kam et al. |
| 4,186,535 A | 2/1980 | Morton |
| 4,256,790 A | 3/1981 | Lackman et al. |
| 4,310,132 A | 1/1982 | Frosch et al. |
| 4,311,661 A | 1/1982 | Palmer |
| 4,331,495 A | 5/1982 | Lackman et al. |
| 4,331,723 A | 5/1982 | Hamm |
| 4,410,577 A | 10/1983 | Palmer et al. |
| 4,448,838 A | 5/1984 | McClenahan et al. |
| 4,463,044 A | 7/1984 | McKinney |
| 4,490,958 A | 1/1985 | Lowe |
| 4,492,607 A | 1/1985 | Halcomb |
| 4,542,055 A | 9/1985 | Fitzsimmons |
| 4,546,717 A | 10/1985 | Marchesi |
| 4,548,017 A | 10/1985 | Blando |
| 4,548,859 A | 10/1985 | Kline et al. |
| 4,571,355 A | 2/1986 | Elrod |
| 4,574,029 A | 3/1986 | Murray |
| 4,608,220 A | 8/1986 | Caldwell et al. |
| 4,615,935 A | 10/1986 | Bendig et al. |
| 4,622,091 A | 11/1986 | Letterman |
| 4,631,221 A | 12/1986 | Disselbeck et al. |
| 4,693,678 A | 9/1987 | Von Volkli |
| 4,699,683 A | 10/1987 | McCowin |
| 4,715,560 A | 12/1987 | Loyek |
| 4,736,566 A | 4/1988 | Krotsch |
| 4,760,444 A | 7/1988 | Nielson et al. |
| 4,780,262 A | 10/1988 | VonVolkli |
| 4,790,898 A | 12/1988 | Woods |
| 4,811,540 A | 3/1989 | Kallies et al. |
| 4,828,202 A | 5/1989 | Jacobs et al. |
| 4,830,298 A | 5/1989 | Van Blunk |
| 4,877,471 A | 10/1989 | McCowin et al. |
| 4,941,182 A | 7/1990 | Patel |
| 4,942,013 A | 7/1990 | Palmer et al. |
| 4,959,110 A | 9/1990 | Russell |
| 4,966,802 A | 10/1990 | Hertzberg |
| 5,024,399 A | 6/1991 | Barquet et al. |
| 5,058,497 A | 10/1991 | Bishop et al. |
| 5,086,997 A | 2/1992 | Glass |
| 5,148,588 A | 9/1992 | Prillard |
| 5,152,949 A | 10/1992 | Leoni et al. |
| 5,223,067 A | 6/1993 | Hamamoto et al. |
| 5,240,376 A | 8/1993 | Velicki |
| 5,242,523 A | 9/1993 | Willden et al. |
| 5,251,849 A | 10/1993 | Torres |
| 5,262,220 A | 11/1993 | Spriggs et al. |
| 5,281,388 A | 1/1994 | Palmer et al. |
| 5,286,438 A | 2/1994 | Dublinski et al. |
| 5,297,760 A | 3/1994 | Hart-Smith |
| 5,337,647 A | 8/1994 | Roberts et al. |
| 5,384,959 A | 1/1995 | Velicki |
| 5,399,406 A | 3/1995 | Matsuo et al. |
| 5,429,326 A | 7/1995 | Garesche et al. |
| 5,439,549 A | 8/1995 | Fryc et al. |
| 5,450,147 A | 9/1995 | Dorsey-Palmateer |
| 5,518,208 A | 5/1996 | Roseburg |
| 5,540,126 A | 7/1996 | Piramoon |
| 5,562,788 A | 10/1996 | Kitson et al. |
| 5,619,837 A | 4/1997 | DiSanto |
| 5,622,733 A | 4/1997 | Asher |
| 5,651,600 A | 7/1997 | Dorsey-Palmateer |
| 5,683,646 A | 11/1997 | Reiling, Jr. |
| 5,700,337 A | 12/1997 | Jacobs et al. |
| 5,746,553 A | 5/1998 | Engwall |
| 5,765,329 A | 6/1998 | Huang |
| 5,804,276 A | 9/1998 | Jacobs et al. |
| 5,809,805 A | 9/1998 | Palmer et al. |
| 5,811,186 A | 9/1998 | Martin et al. |
| 5,814,386 A | 9/1998 | Vasiliev et al. |
| 5,871,117 A | 2/1999 | Protasov et al. |
| 5,883,646 A | 3/1999 | Beauchamp |
| 5,893,534 A | 4/1999 | Watanabe |
| 5,902,535 A | 5/1999 | Burgess et al. |
| 5,915,317 A | 6/1999 | Thrash et al. |
| 5,931,107 A | 8/1999 | Thrash et al. |
| 5,951,800 A | 9/1999 | Pettit |
| 5,953,231 A | 9/1999 | Miller et al. |
| 5,954,917 A | 9/1999 | Jackson et al. |
| 5,963,660 A | 10/1999 | Koontz et al. |
| 5,979,531 A | 11/1999 | Barr et al. |
| 6,003,812 A | 12/1999 | Micale et al. |
| 6,012,883 A | 1/2000 | Engwall et al. |
| 6,013,341 A | 1/2000 | Medvedev et al. |
| 6,045,651 A | 4/2000 | Kline et al. |
| 6,051,089 A | 4/2000 | Palmer et al. |
| 6,070,831 A | 6/2000 | Vassiliev et al. |
| 6,074,716 A | 6/2000 | Tsotsis |
| 6,086,696 A | 7/2000 | Gallagher |
| 6,099,906 A | 8/2000 | Palmer et al. |
| 6,112,792 A | 9/2000 | Barr et al. |
| 6,114,012 A | 9/2000 | Amaoka et al. |
| 6,114,050 A | 9/2000 | Westre et al. |
| 6,128,545 A | 10/2000 | Miller |
| 6,129,031 A | 10/2000 | Sarh et al. |
| 6,136,237 A | 10/2000 | Straub et al. |
| 6,155,450 A | 12/2000 | Vasiliev et al. |
| 6,168,358 B1 | 1/2001 | Engwall et al. |
| 6,187,411 B1 | 2/2001 | Palmer |
| 6,190,484 B1 | 2/2001 | Appa |
| 6,198,983 B1 | 3/2001 | Thrash et al. |
| 6,205,239 B1 | 3/2001 | Lin et al. |
| 6,231,941 B1 | 5/2001 | Cundiff et al. |
| 6,319,447 B1 | 11/2001 | Cundiff et al. |
| 6,364,250 B1 | 4/2002 | Brinck et al. |
| 6,374,750 B1 | 4/2002 | Early |
| 6,390,169 B1 | 5/2002 | Johnson |
| 6,415,581 B1 | 7/2002 | Shipman et al. |
| 6,431,837 B1 | 8/2002 | Velicki |
| 6,451,152 B1 | 9/2002 | Holmes et al. |
| 6,480,271 B1 | 11/2002 | Cloud et al. |
| 6,508,909 B1 | 1/2003 | Cerezo Pancorbo et al. |
| 6,510,961 B1 | 1/2003 | Head et al. |
| 6,511,570 B2 | 1/2003 | Matsui |
| 6,560,843 B2 | 5/2003 | Cundiff et al. |
| 6,561,478 B2 | 5/2003 | Cundiff et al. |
| 6,589,618 B2 | 7/2003 | Cundiff et al. |
| 6,613,258 B1 | 9/2003 | Maison et al. |
| 6,620,484 B1 | 9/2003 | Bolukbasi et al. |
| 6,622,974 B1 | 9/2003 | Dockter et al. |
| 6,648,273 B2 | 11/2003 | Anast |
| 6,663,737 B2 | 12/2003 | Hsiao et al. |
| 6,692,681 B1 | 2/2004 | Lunde |
| 6,702,911 B2 | 3/2004 | Toi et al. |
| 6,709,538 B2 | 3/2004 | George et al. |
| 6,718,457 B2 | 4/2004 | Tremblay et al. |
| 6,730,184 B2 | 5/2004 | Kondo et al. |
| 6,743,504 B1 | 6/2004 | Allen et al. |
| 6,766,984 B1 | 7/2004 | Ochoa |
| 6,779,707 B2 | 8/2004 | Dracup et al. |
| 6,786,452 B2 | 9/2004 | Yamashita et al. |
| 6,799,619 B2 | 10/2004 | Holmes et al. |
| 6,802,931 B2 | 10/2004 | Fujihira |
| 6,814,822 B2 | 11/2004 | Holmes et al. |
| 6,817,574 B2 | 11/2004 | Solanille et al. |
| 6,823,578 B2 | 11/2004 | Anderson et al. |
| 6,840,750 B2 | 1/2005 | Thrash et al. |
| 6,860,957 B2 | 3/2005 | Sana et al. |
| 6,871,864 B2 | 3/2005 | Reineck |
| 6,896,841 B2 | 5/2005 | Velicki et al. |
| 6,910,043 B2 | 6/2005 | Iivonen et al. |
| 7,025,305 B2 | 4/2006 | Folkesson et al. |
| 7,039,485 B2 | 5/2006 | Engelbart et al. |
| 7,039,797 B2 | 5/2006 | Huang et al. |
| 7,048,024 B2 | 5/2006 | Clark et al. |
| 7,074,474 B2 | 7/2006 | Toi et al. |

| | | |
|---|---|---|
| 7,080,441 B2 | 7/2006 | Braun |
| 7,080,805 B2 | 7/2006 | Prichard et al. |
| 7,083,698 B2 | 8/2006 | Engwall et al. |
| 7,093,787 B2 | 8/2006 | Garrettson et al. |
| 7,125,305 B2 | 10/2006 | Green et al. |
| 7,132,161 B2 | 11/2006 | Knowles et al. |
| 7,134,629 B2 | 11/2006 | Johnson et al. |
| 7,137,182 B2 | 11/2006 | Nelson |
| 7,141,199 B2 | 11/2006 | Sana et al. |
| 7,159,822 B2 | 1/2007 | Grantham et al. |
| 7,171,033 B2 | 1/2007 | Engelbart et al. |
| 7,193,696 B2 | 3/2007 | Engelbart et al. |
| 7,195,201 B2 | 3/2007 | Grether et al. |
| 7,228,611 B2 | 6/2007 | Anderson et al. |
| 7,236,625 B2 | 6/2007 | Engelbart et al. |
| 7,278,198 B2 | 10/2007 | Olson et al. |
| 7,282,107 B2 | 10/2007 | Johnson et al. |
| 7,289,656 B2 | 10/2007 | Engelbart et al. |
| 7,325,771 B2 | 2/2008 | Stulc et al. |
| 7,334,782 B2 | 2/2008 | Woods et al. |
| 7,407,556 B2 | 8/2008 | Oldani et al. |
| 7,413,695 B2 | 8/2008 | Thrash et al. |
| 7,503,368 B2 | 3/2009 | Chapman et al. |
| 7,527,222 B2 | 5/2009 | Biornstad et al. |
| 7,601,421 B2 | 10/2009 | Khabashesku et al. |
| 7,624,488 B2 | 12/2009 | Lum et al. |
| 7,662,251 B2 | 2/2010 | Salama et al. |
| 7,716,835 B2 | 5/2010 | Johnson et al. |
| 8,042,767 B2 | 10/2011 | Velicki et al. |
| 8,061,035 B2 | 11/2011 | Stulc et al. |
| 2003/0190455 A1 | 10/2003 | Burgess et al. |
| 2004/0035979 A1 | 2/2004 | McCoskey, Jr. et al. |
| 2004/0219855 A1 | 11/2004 | Tsotsis |
| 2004/0222080 A1 | 11/2004 | Tour et al. |
| 2005/0059309 A1 | 3/2005 | Tsotsis |
| 2005/0163965 A1 | 7/2005 | Velicki et al. |
| 2006/0118244 A1 | 6/2006 | Zaballos et al. |
| 2007/0128960 A1 | 6/2007 | Ghasemi Nejhad et al. |
| 2008/0246175 A1 | 10/2008 | Biornstad et al. |
| 2008/0286564 A1 | 11/2008 | Tsotsis |
| 2009/0139641 A1 | 6/2009 | Chapman et al. |
| 2011/0073708 A1 | 3/2011 | Biornstad et al. |

FOREIGN PATENT DOCUMENTS

| | | |
|---|---|---|
| DE | 3331494 A1 | 3/1985 |
| EP | 0198744 A1 | 10/1986 |
| EP | 0319797 A2 | 6/1989 |
| EP | 0833146 A2 | 4/1998 |
| EP | 1149687 A2 | 10/2001 |
| GB | 2224000 A | 4/1990 |
| JP | 61169394 A | 7/1986 |
| JP | 2001310798 A | 11/2011 |
| WO | WO9832589 A1 | 7/1998 |
| WO | WO03035380 A1 | 5/2003 |
| WO | WO2004025003 A2 | 3/2004 |
| WO | WO2005057497 A1 | 6/2005 |

OTHER PUBLICATIONS

Ando et al., "Growing Carbon Nanotubes," Materials| Today, Oct. 2004, pp. 22-29.
"The Barrelful of Experience," Intervia, May 1992, 2 PAGES.
"Photograph of British Aerospace Aircraft," BAe 146, circa 2000, 1 PAGE.
Beechcraft's Composite Challenge, 2 PAGES, accessed Mar. 1, 2004, http://www.aerotalk.com/Beech.cfm.
Scott, "Business Aviation," Jun. 2002, 2 PAGES, accessed Mar. 1, 2004, http://www..aviationnow.cm/avnow/news/channel_busav.jsp?view=story&id=news/btoyo0607.xml.
Zhang "Vorlesung: Angewandte Sensorik," University of Hamburg, XP-002327793, Nov. 2003, 20 PAGES.
"CNC fiber placement used to create an all-composite fuselage," Aerospace Engineering Online, 3 PAGES, accessed Aug. 31, 2006, http://www.sae.org/aeromag/techinnovations/1298t08.htm.
Evans, "Fiber Placement," Manufacturing Processes, ASM Handbook, vol. 21, 2001, pp. 477-479.
Fiedler et al., "TANGO Composite Fuselage Platform," SAMPE Journal, vol. 39, No. 1, Jan./Feb. 2003, 8 PAGES.
Garcia et al., "Hybrid Carbon Nanotube—Composite Architectures," MTL Annual Research Report, Sep. 2006, 1 PAGE.
Grimshaw et al., "Advanced Technology Tape Laying for Affordable Manufacturing of Large Composite Structures," 46th International SAMPE Symposium, May 2001, pp. 2484-2494.
Grimshaw, "Automated Tape Laying," ASM Handbook vol. 21, Composites (ASM International), 2001, pp. 480-485.
"Growing Carbon Nanotubes Aligned With Patterns," NASA's Jet Propulsion Laboratory, Pasadena, CA, 4 PAGES, accessed Mar. 21, 2007, http:www.nasatech.com/Briefs/Oct02/NP030205.html.
"The Longest Carbon Nanotubes You Have Ever Seen," Space Mart, May 2007, 3 PAGES.
"Premier I Features Lighter, Stronger All-Composite Fuselage," WolfTracks Company Magazines, vol. 4, No. 1, 1998, 3 pp.
"Raytheon Aircraft Orders Four More Fiber Cincinnnati Fiber Placement Systems for Industry's First Composite-Fuselage Business Jets," Jul. 20, 2000, 2 pages.
"Raytheon Aircraft's Hawker Horizon Reaches Fulelage Milestone," press release, 3 pp., accessed Aug. 31, 2006, http://www.beechcraft.de/Presse/2000/100900b.htm.
"Raytheon's New Quiet Jets," Vibro-Acoustic Sciences Newsletter, vol. 4, No. 2, Mar. 2000, 2 pages.
"Rocky Mountain Composites," 1 page, accessed Feb. 28, 2004, http://www.rockymountaincomposites.com/wind-sys.htm.
Sharp et al., "Material Selection/Fabrication issues for Thermoplastic Fiber Placement," Journal of Thermoplastic Composite Materials, vol. 8, Jan. 1995, pp. 2-14.
Velicki et al., "Damage Arrest Design Approach Using Stitched Composites," 2nd Aircraft Structural Design Conference, 2010, pp. 1-9.
"Wondrous World of Carbon Nanotubes," Multi-Disciplinair Project, 23 PAGES, accessed Mar. 21, 2007< http://students.chem.tue.nl/ifp03/synthesis.html.
USPTO non-final office action dated Jan. 20, 2011 regarding U.S. Appl. No. 12/367,479, 19 PAGES.
USPTO non-final office action dated Jul. 22, 2011 regarding U.S. Appl. No. 12/367,479, 11 PAGES.
USPTO notice of allowance dated Dec. 27, 2011 regarding U.S. Appl. No. 12/367,479, 10 PAGES.
Preliminary amendment dated Feb. 6, 2009 regarding U.S. Appl. No. 12/367,479, 10 PAGES.
Amendment in response to non-final office action dated Nov. 30, 2011 regarding U.S. Appl. No. 12/367,479, 15 PAGES.
Amendment in response to non-final office action dated Apr. 8, 2011 regarding U.S. Appl. No. 12/367,479, 9 PAGES.
Response to restriction requirement dated Jan. 11, 2010 regarding U.S. Appl. No. 12/367,479, 8 PAGES.
USPTO requirement for restriction dated Oct. 18, 2010 regarding U.S. Appl. No. 12/367,479, 5 PAGES.
Amendment after notice of allowance dated Jan. 30, 2009 regarding U.S. Appl. No. 10/996,922, 2 PAGES.
USPTO Interview summary dated Jan. 22, 2008 regarding U.S. Appl. No. 10/996,922, 4 PAGES.
USPTO Interview Summary dated Sep. 8, 2008 regarding U.S. Appl. No. 10/996,922, 2 PAGES.
USPTO non-final office action dated Oct. 31, 2007 regarding U.S. Appl. No. 10/996,922, 11 PAGES.
USPTO notice of allowance dated Oct. 31, 2008 regarding U.S. Appl. No. 10/996,922, 7 PAGES.
Response to restriction requirement dated Jun. 22, 2007 regarding U.S. Appl. No. 10/996,922, 12 PAGES.
Response to restriction requirement dated Oct. 1, 2007 regarding U.S. Appl. No. 10/996,922, 7 PAGES.
Response to non-final office action dated Jan. 17, 2008 regarding U.S. Appl. No. 10/996,922, 11 PAGES.
Amendment after final office action dated Sep. 16, 2008 regarding U.S. Appl. No. 10/996,922, 8 PAGES.
USPTO restriction requirement dated Jun. 1, 2007 regarding U.S. Appl. No. 10/996,922, 8 PAGES.
USPTO restriction requirement dated Sep. 7, 2009 regarding U.S. Appl. No. 10/996,922, 6 PAGES.

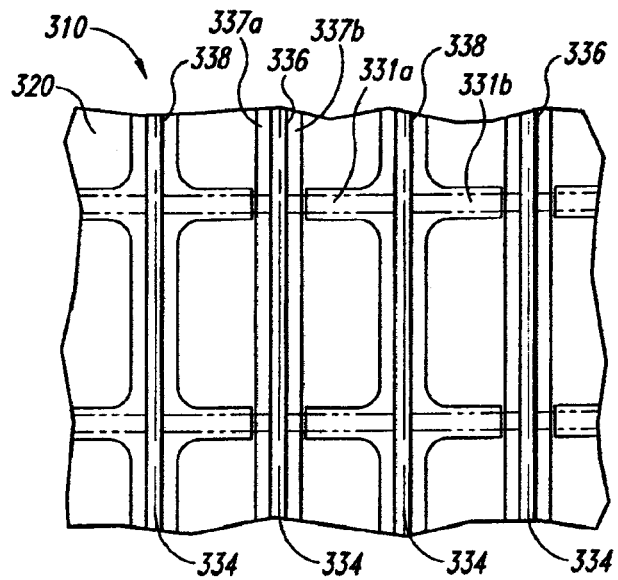
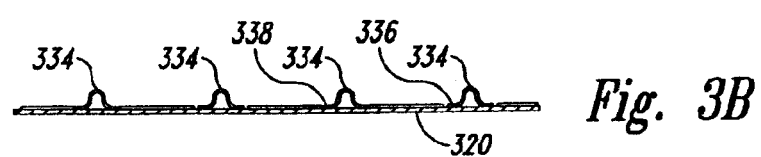
Fig. 3A
Fig. 3B
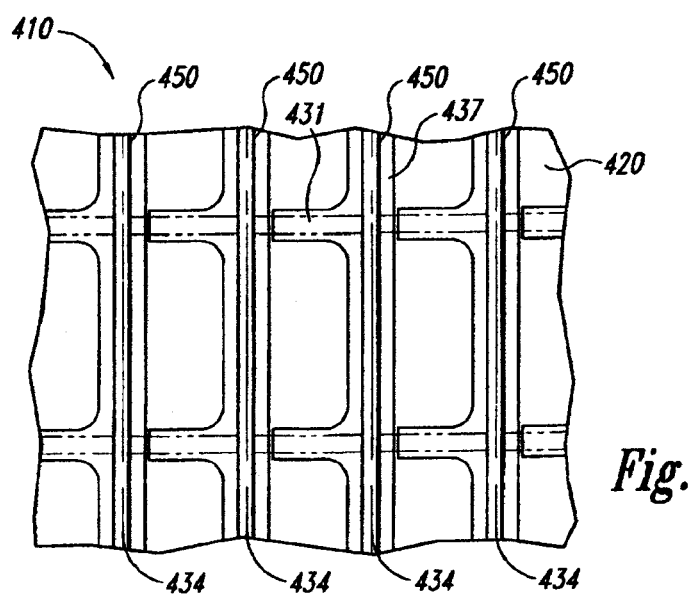
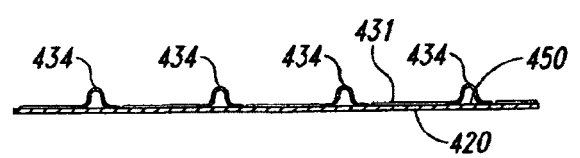
Fig. 4A
Fig. 4B

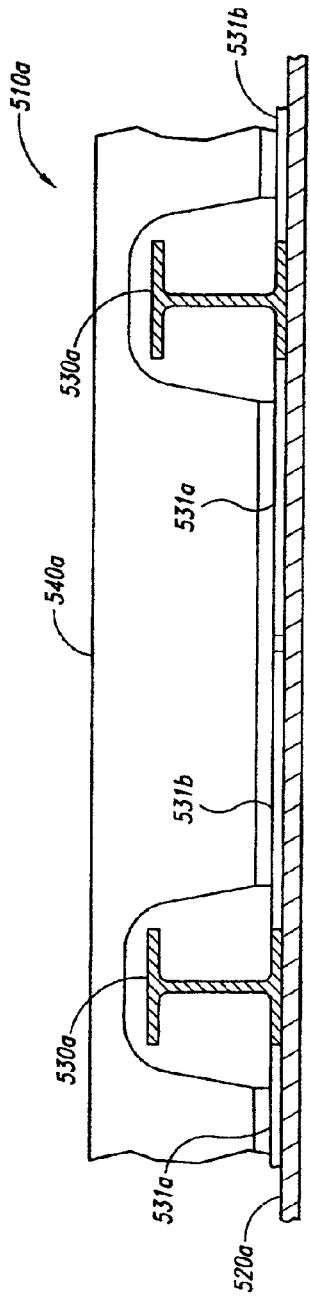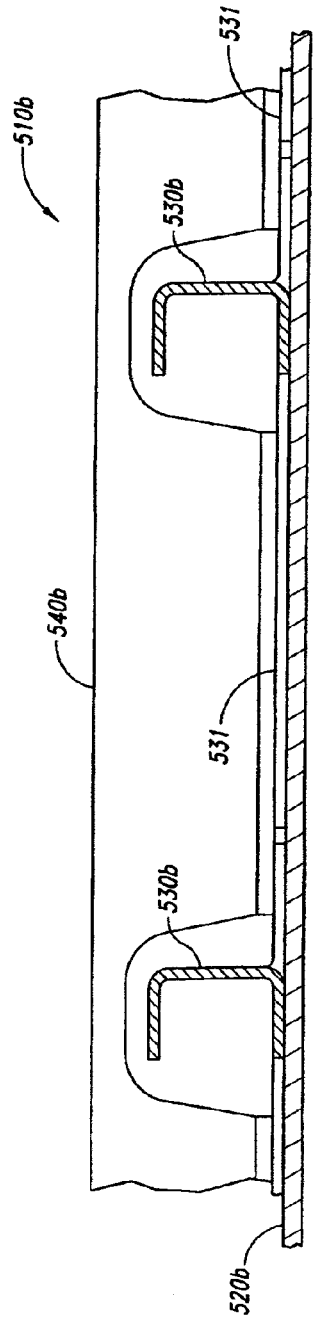
Fig. 5A
Fig. 5B

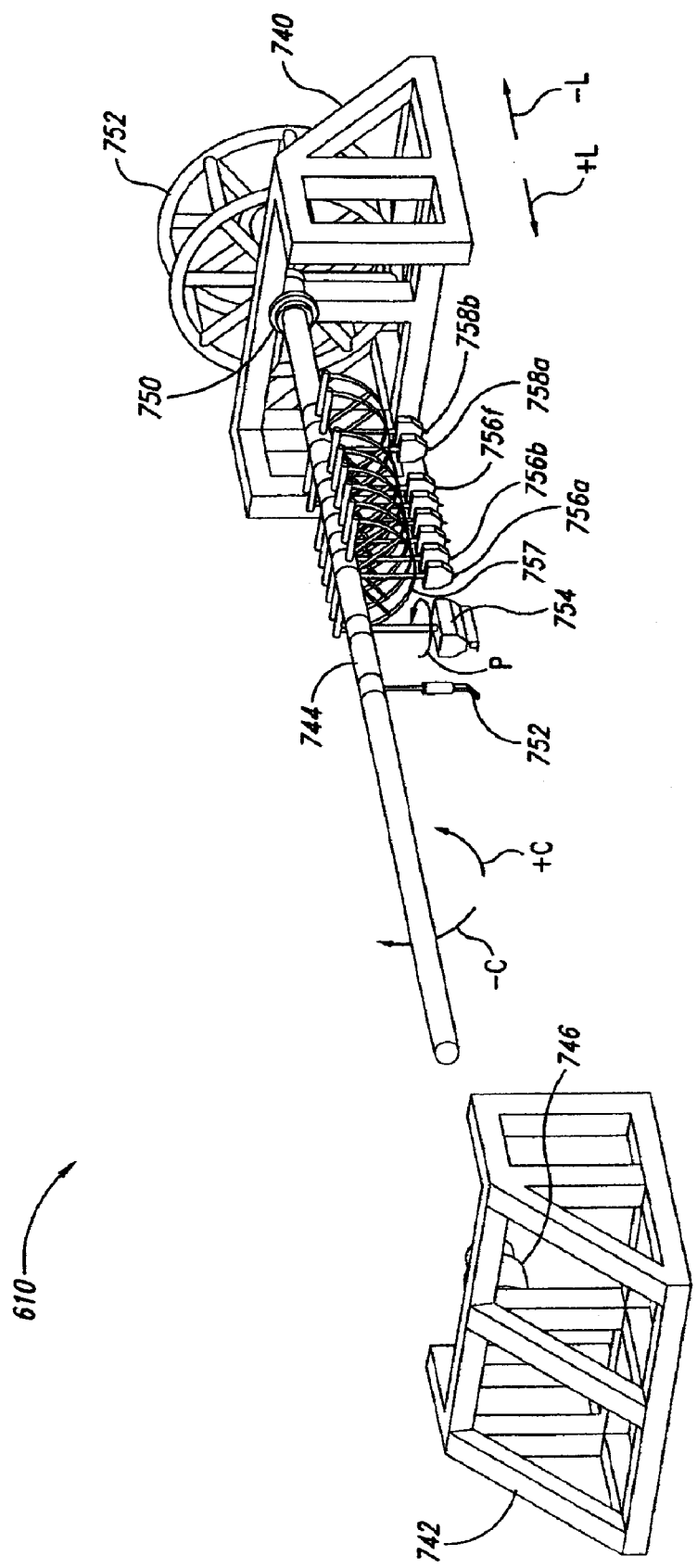

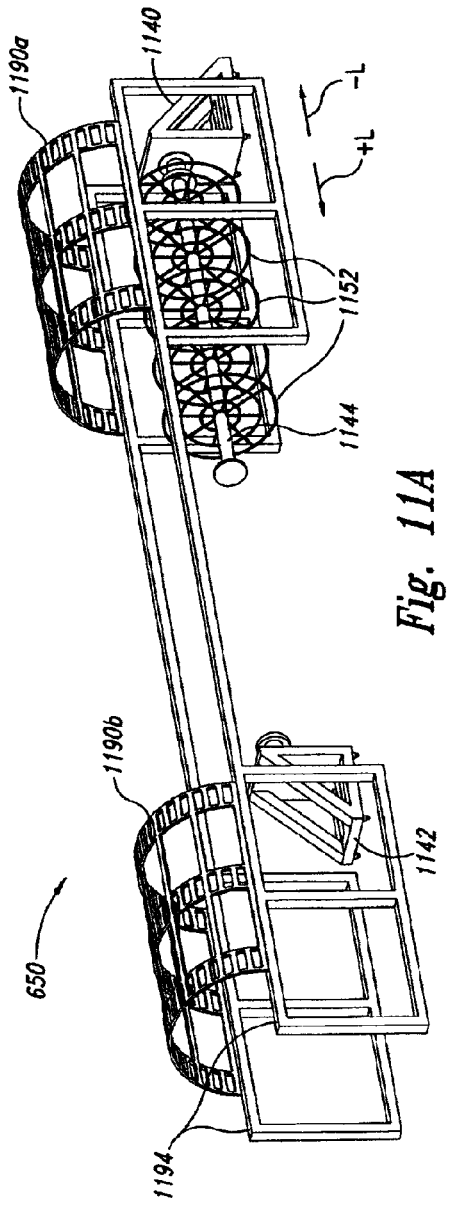
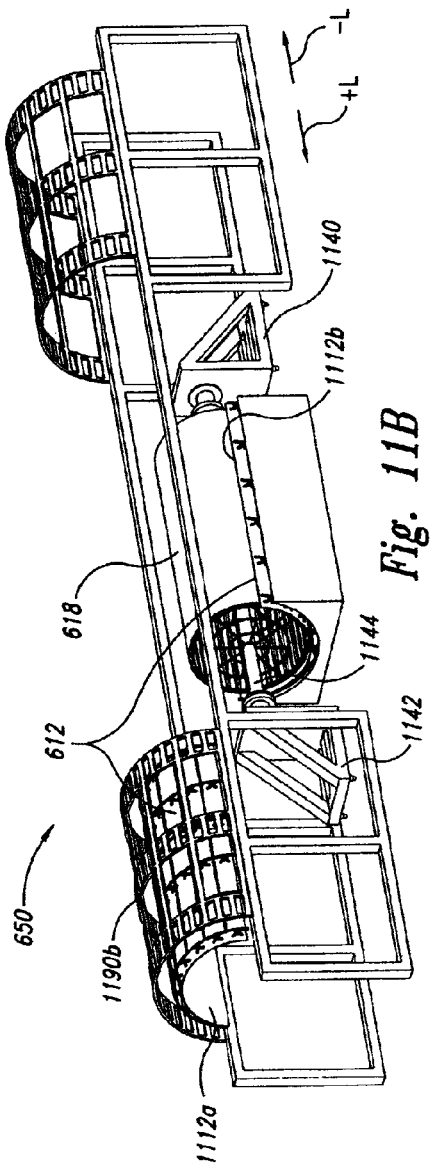
Fig. 11A
Fig. 11B

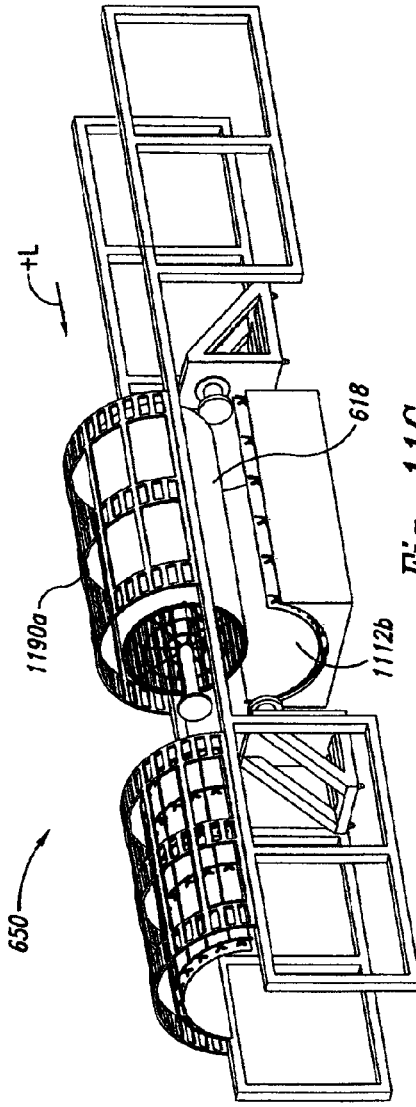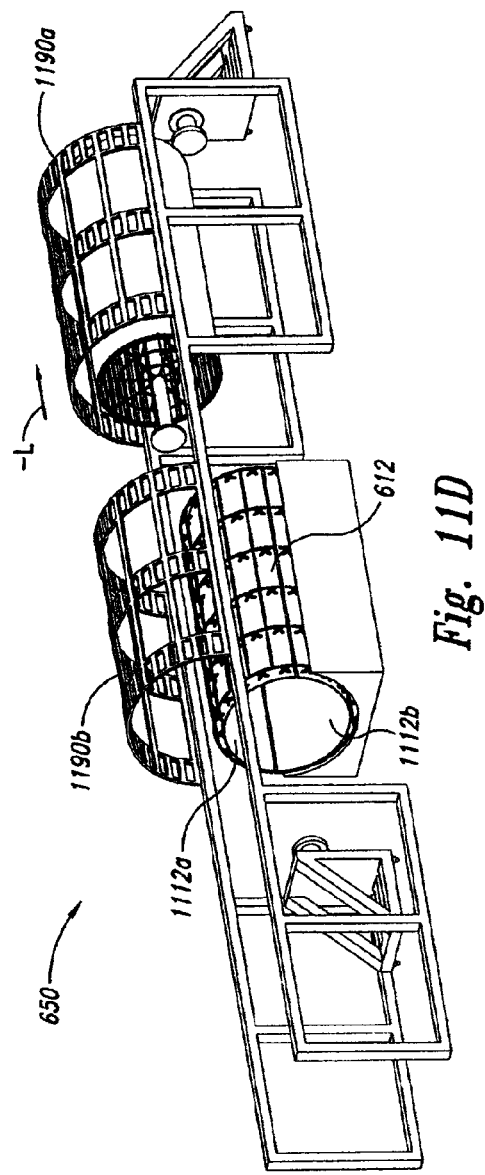

METHODS FOR MANUFACTURING COMPOSITE SECTIONS FOR AIRCRAFT FUSELAGES AND OTHER STRUCTURES

This application is a divisional of application Ser. No. 12/367,479, filed Feb. 6, 2009, status allowed, which is a divisional of application Ser. No. 10/996,922, filed Nov. 24, 2004, now U.S. Pat. No. 7,503,368, issued on Mar. 17, 2009.

TECHNICAL FIELD

The following disclosure relates generally to composite structures and, more particularly, to methods and systems for manufacturing composite sections for aircraft fuselages and other structures.

BACKGROUND

The primary structural elements of passenger jets and other large aircraft are typically made from metal. Fuselage shells for such aircraft, for example, are typically made from high-strength aluminum alloys. Although some composite materials may offer higher strength-to-weight ratios than aluminum alloys, there are often difficulties with manufacturing large shell structures from composite materials. For this reason, the use of composite materials for fuselage shells has mostly been limited to smaller aircraft, such as fighter aircraft, high-performance private aircraft, and business jets.

Composite materials typically include glass, carbon, or polyaramide fibers in a matrix of epoxy or other resin. One known method for manufacturing business jet airframes with composite materials is employed by the Raytheon Aircraft Company of Wichita, Kansas, to manufacture the Premier I and Hawker Horizon business jets. This method involves wrapping carbon fibers around a rotating mandrel with an automated fiber placement system. The mandrel provides the basic shape of a longitudinal fuselage section. The carbon fibers are preimpregnated with a thermoset epoxy resin, and are applied over the rotating mandrel in multiple plies to form an interior skin of the fuselage section. The interior skin is then covered with a layer of honeycomb core. The fiber placement system then applies additional plies of preimpregnated carbon fibers over the honeycomb core to form an exterior skin that results in a composite sandwich structure.

The Premier I fuselage includes two 360-degree sections formed in the foregoing manner. The Hawker Horizon fuselage includes three such sections formed in this manner. The two 70-inch diameter sections of the Premier I fuselage are riveted and then bonded together at a circumferential splice joint to form the complete fuselage structure. The much larger Hawker Horizon fuselage, with an 84-inch diameter, uses aluminum splice plates at two circumferential joints to join the three fuselage sections together into a complete structure. (See Raytheon Aircraft news release at http://www.beechcraft.de/presse/2000/100900b.htm entitled "RAYTHEON AIRCRAFTS HAWKER HORIZON REACHES FUSELAGE MILESTONE," Oct. 9, 2000).

Filament winding, fiber placement, and tape laying are three known methods for applying unidirectional composite fibers to a rotating mandrel to form a continuous cylindrical skin. In a filament winding process, the mandrel is typically suspended horizontally between end supports. The mandrel rotates about the horizontal axis as a fiber application instrument moves back and forth along the length of the mandrel, placing fiber onto the mandrel in a predetermined configuration. In most applications, the filament winding apparatus passes the fiber material through a resin "bath" just before the material touches the mandrel. This is called "wet winding." In other applications, the fiber has been preimpregnated with resin, eliminating the need for the resin bath. Following oven or autoclave curing of the resin, the mandrel can remain in place and become part of the wound component, or it can be removed.

The fiber placement process typically involves the automated placement of multiple "tows" (i.e., untwisted bundles of continuous filaments, such as carbon or graphite fibers, preimpregnated with a thermoset resin material such as epoxy) tape, or slit tape onto a rotating mandrel at high speed. A typical tow is between about 0.12" and 0.25" wide when flattened. Conventional fiber placement machines dispense multiple tows to a movable payoff head that collimates the tows (i.e., renders the tows parallel) and applies the tows to the rotating mandrel surface using one or more compaction rollers that compress the tows against the surface. In addition, such machines typically include means for dispensing, clamping, cutting and restarting individual tows during placement.

Tape laying is similar to the fiber placement process described above except that preimpregnated fiber tape, rather than individual tows, is laid down on a flat or contoured tool (e.g., a stationary or rotating mandrel) to form the part. One form of tape includes a paper backing that maintains the width and orientation of the fibers. The paper backing is removed during application. Slit tape is tape that has been slit after being produced in standard widths by the manufacturer. Slitting the tape results in narrower widths that allow enhanced stearability and tailoring during application to achieve producibility and design objectives. Slit tape can have widths varying from about 0.12 inch up to about 6 inches, and may or may not include backing paper. Another form of tape includes multiple individual fibers woven together with a cloth material. As used throughout this disclosure, unless otherwise indicated, the term "tape" refers to tape, tape with backing paper, slit tape, and other types of composite material in tape form for use in manufacturing composite structures. Tape laying is often used for parts with highly complex contours or angles because the tape allows relatively easy directional changes.

SUMMARY

The present invention is directed generally toward composite sections for aircraft fuselages and other structures, and methods and systems for manufacturing such sections. A system for manufacturing a composite shell structure in accordance with one aspect of the invention includes a tool and an equipment support member. The equipment support member is configured to extend adjacent to a mold surface of the tool. The system further includes a composite material applicator carried by the equipment support member and configured to apply composite material to the mold surface. In one embodiment of the system, the tool can be a lay-up mandrel, and the equipment support member can extend at least partially through the lay-up mandrel.

A system for manufacturing a composite shell structure in accordance with another aspect of the invention includes a first equipment support member and a second equipment support member. The first equipment support member is configured to be positioned at least partially within a female tool having an interior mold surface. The second equipment support member is configured to be positioned at least partially outside of the female tool in operational alignment with the first equipment support member. The system further includes a stiffener placement tool having a plurality of stiffener holding portions configured to carry a plurality of corresponding stiffeners. The stiffener placement tool is movable from the second equipment support member to the first equipment support member to place the plurality of stiffeners at least proximate to the interior mold surface of the female tool. In one embodiment of the system, the stiffener placement tool can include at least one actuator configured to press a portion of the plurality of stiffeners against a composite lay-up on the interior mold surface of the female tool.

A method for manufacturing a shell structure in accordance with a further aspect of the invention includes applying composite material to an interior mold surface of a tool to form a skin lay-up extending 360 degrees around an axis. The method further includes positioning a plurality of stiffeners on an inner surface of the skin lay-up, and at least partially cocuring the skin lay-up and the plurality of stiffeners to bond the plurality of stiffeners to the skin lay-up. In one embodiment, the method can additionally include positioning vacuum bag material over the plurality of stiffeners and the skin lay-up, and evacuating a volume under the vacuum bag material to press the plurality of stiffeners and the skin lay-up outwardly against the interior mold surface of the tool.

BRIEF DESCRIPTION OF THE DRAWINGS

FIGS. 3A and 3B are top and end views, respectively, of a portion of a fuselage section configured in accordance with another embodiment of the invention.

FIGS. 4A and 4B are top and end views, respectively, of a portion of a fuselage section configured in accordance with a further embodiment of the invention.

FIGS. 5A and 5B are cross-sectional end views of portions of fuselage sections configured in accordance with yet other embodiments of the invention.

FIG. 7A is an enlarged, partially schematic isometric view of a skin lay-up station of FIG. 6.

FIG. 11A is an enlarged, partially schematic isometric view of a transfer station of FIG. 6 configured in accordance with an embodiment of the invention, and FIGS. 11B-11E are partially schematic isometric views illustrating a method of using the transfer station to remove a shell structure from a lay-up mandrel.

DETAILED DESCRIPTION

The following disclosure describes composite sections for aircraft fuselages and other structures, and methods and systems for manufacturing such sections. Certain details are set forth in the following description and in FIGS. 1-13 to provide a thorough understanding of various embodiments of the invention. Other details describing well-known structures and systems often associated with aircraft structures and composite fabrication techniques are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

The following disclosure includes two parts. The first part describes composite panel structures and associated fuselage sections to provide a context for the discussion that follows. The second part describes various methods and systems for manufacturing composite fuselage sections, such as those described in part one of the disclosure.

I. Composite Sections

Figure 1:
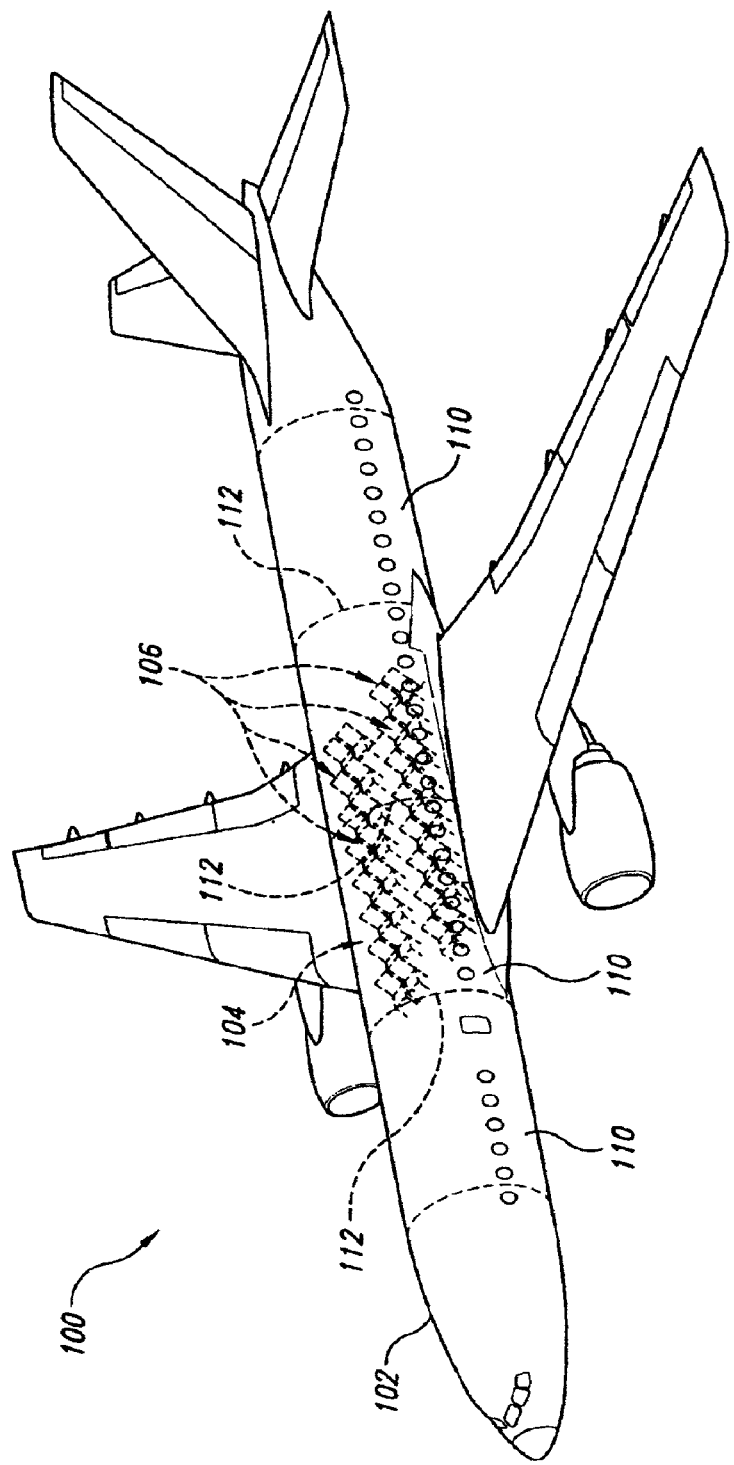
FIG. 1 is a partially hidden isometric view of an aircraft having a fuselage that includes a plurality of sections configured in accordance with an embodiment of the invention.

FIG. 1 is a partially hidden isometric view of an aircraft 100 having a fuselage 102 formed from a plurality of sections 110 in accordance with an embodiment of the invention. In one aspect of this embodiment described in greater detail below, each of the sections 110 can be individually fabricated as a one-piece section from composite materials. After fabrication, the sections 110 can be joined or spliced together by adhesive bonding and/or mechanical fastening along circumferential joints 112 to form the fuselage 102. Various methods, systems, and structures for joining the sections 110 together are described in detail in copending U.S. patent application Ser. No. 10/949,848, entitled "SPLICE JOINTS FOR COMPOSITE AIRCRAFT FUSELAGES AND OTHER STRUCTURES," which was filed on Sep. 23, 2004, and is incorporated by reference.

Although the sections 110 are depicted in FIG. 1 as barrel sections or enclosed shell structures extending 360 degrees about an axis, the methods and systems disclosed herein are not limited to this particular configuration. Rather, the methods and systems disclosed herein can be used to manufacture other structural configurations including, for example, open shell structures and non-cylindrical shells having circular, oval, elliptical, egg-shaped, and other symmetrical and/or asymmetrical cross-sectional shapes. Such structural configurations also include curved panels, flat panels, sandwich structures, etc.

In another aspect of this embodiment, the fuselage 102 can include a passenger cabin 104 configured to hold a plurality of passenger seats 106. In the illustrated embodiment, the passenger cabin 104 is configured to hold at least about 50 passenger seats. For example, in this embodiment the passenger cabin 104 can be configured to hold from about 50 to about 700 passenger seats. In another embodiment, the passenger cabin 104 can be configured to hold from about 100 to about 400 passenger seats. In further embodiments, the passenger cabin 104 can be configured to hold more or fewer seats or, alternatively, a portion of the passenger seats 106 can be omitted and the open space can be used for other purposes, such as hauling cargo.

Figure 2A:
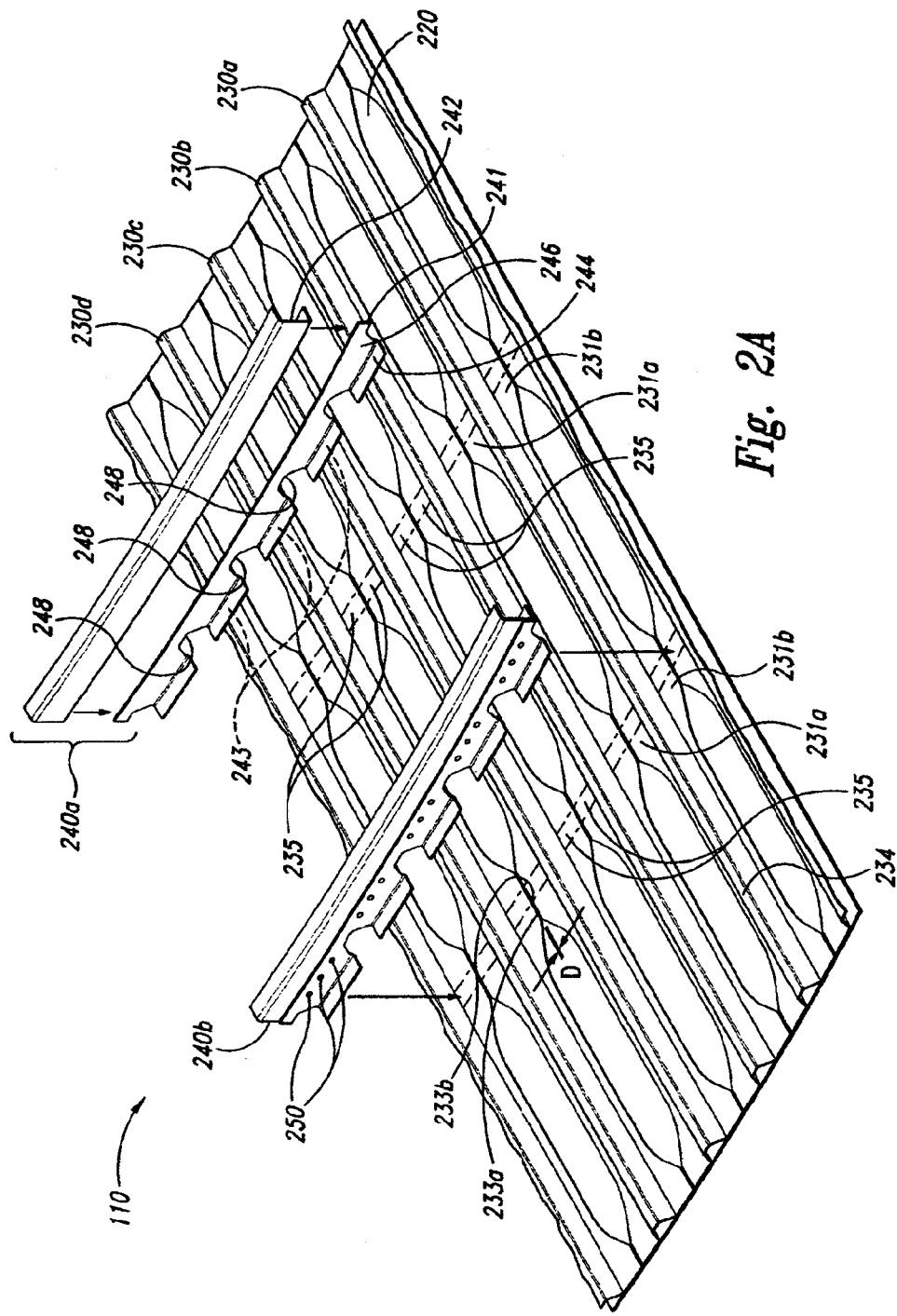
FIGS. 2A and 2B are an exploded isometric view and an assembled isometric view, respectively, of a portion of a fuselage section configured in accordance with an embodiment of the invention.
Figure 2B:
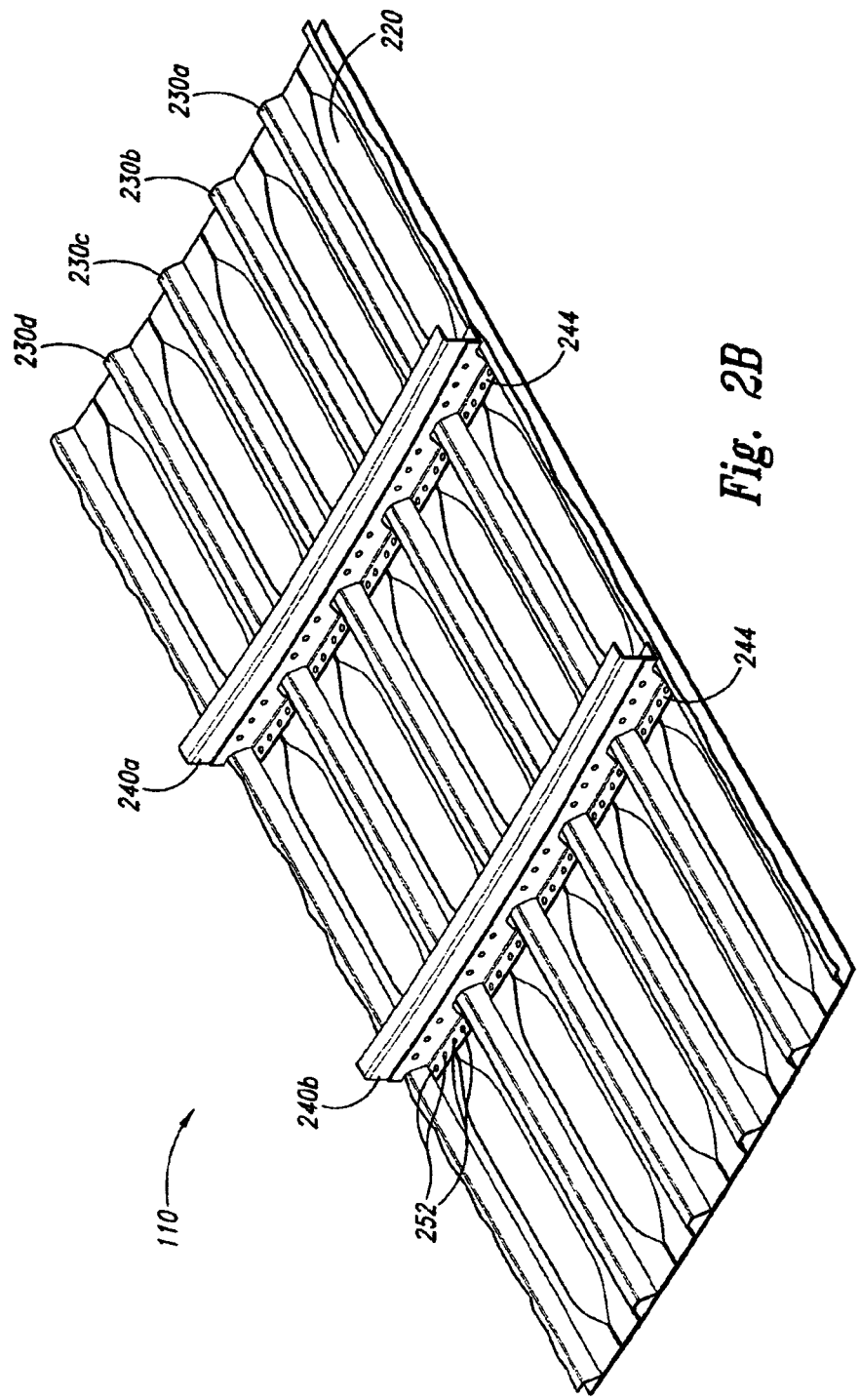

FIG. 2A is an enlarged, partially exploded, interior isometric view of a portion of one of the sections 110 of FIG. 1, configured in accordance with an embodiment of the invention. FIG. 2B is an assembled isometric view of the section portion of FIG. 2A. Referring to FIGS. 2A and 2B together, the section 110 can include a plurality of stiffeners 230 (identified individually as stiffeners 230a-d) attached to a skin 220. Each of the stiffeners 230 can include a raised portion 234 projecting away from the skin 220 and a plurality of flange portions 231 (identified as a plurality of first flange portions 231a extending outwardly from one side of the stiffener 230, and a plurality of second flange portions 231b extending outwardly from an opposite side of the stiffener 230). The flange portions 231 can be mated directly to the skin 220. In the illustrated embodiment, the stiffeners 230 have hat-shaped cross-sections. In other embodiments described below, however, the stiffeners 230 can have other cross-sectional shapes including C-sections, L-sections, I-sections, J-sections, etc.

The skin 220 and the stiffeners 230 typically are graphite/epoxy composites with the stiffeners 230 bonded to the skin 220 in a cocuring process at elevated temperatures and pressures. The stiffeners 230 and skin 220, however, can be fastened together in other bonding processes, including adhesive bonding of pre-cured components, mechanical fastening, or some combination of these processes.

Each stiffener 230 can be positioned on the skin 220 so that the plurality of first flange portions 231a of one stiffener 230 are aligned with the corresponding plurality of second flange portions 231b of an adjacent stiffener 230. For example, each of the first flange portions 231a can include a first outer edge 233a, and each of the second flange portions 231b can include a corresponding second outer edge 233b. In one embodiment, the first outer edge 233a can be spaced apart from the second outer edge 233b by a distance D of about 0.5 inch or less. In another embodiment, the distance D can be about 0.2 inch or less, e.g., about 0.1 inch. In yet another embodiment, the stiffeners 230 can be positioned on the skin 220 such that the first flange portions 231a at least approximately contact the second flange portions 231b. In this case, the distance D is at least approximately zero. When the flange portions 231 are aligned in the foregoing manner, the flange portions 231 can form a plurality of at least approximately continuous support surfaces 235 extending between the raised portions 234 of the stiffeners 230.

The section 110 can further include a plurality of support members or frames 240 (identified individually as a first frame 240a and a second frame 240b). In the illustrated embodiment, the frames 240 are two-piece frames that include a first frame section 241 and a second frame section 242. In this embodiment, the second frame section 242 has a C-shaped cross-section. In other embodiments, the second frame section 242 can have other cross-sectional shapes, such as an L-shaped cross-section. In yet other embodiments, the frames 240 can be omitted or, alternatively, the section 110 can include other frames composed of more or fewer frame sections.

The first frame section 241 includes a base portion 244 and an upstanding portion 246 projecting away from the base portion 244. The upstanding portion 246 can include a plurality of openings, e.g., "mouse holes" 248 through which the raised portions 234 of the stiffeners 230 extend. The base portion 244 can include a plurality of mating surfaces 243 extending between the mouse holes 248. The mating surfaces 243 are configured to contact corresponding ones of the support surfaces 235 extending between the raised portions 234 of the stiffeners 230. The mating surfaces 243 of the illustrated embodiment are absent any joggles between the mouse holes 248 because the corresponding support surfaces 235 to which they mate are at least approximately continuous between the stiffeners 230 and do not include any significant surface steps or misalignments. An advantage of this feature is that it avoids the added costs associated with manufacturing frames with joggles. Such costs may be particularly significant when working with composite materials because, unlike creating joggles or steps in metals, which are malleable and can be easily formed, creating joggles or steps in composite surfaces typically requires special tooling and/or post-cure machining.

In one embodiment of the invention, the first frame section 241 can be attached to the section 110 first, and then the second frame section 242 can be attached to the first frame section 241. When attaching the first frame section 241 to the section 110, the base portion 244 of the first frame section 241 is mated to the flange portions 231 of the stiffeners 230 without being mated to the skin 220. That is, the mating surfaces 243 of the base portion 244 contact the support surfaces 235 but not the skin 220. In this manner, the flange portions 231 are effectively sandwiched between the first frame section 241 and the skin 220. In one embodiment, the first frame section 241 can be fastened to the section 110 with a series of suitable fasteners 252, as shown in FIG. 2B. In another embodiment, the base portion 244 can be adhesively bonded directly to the flange portions 231.

After the first frame section 241 has been attached to the section 110, the second frame section 242 can be attached to the first frame section 241. In one embodiment, the second frame section 242 can be fastened to the upstanding portion 246 of the first frame section 241 with a series of suitable fasteners 250, as shown in FIG. 2A. In another embodiment, the second frame section 242 can be adhesively bonded to the upstanding portion 246. One advantage of attaching the second frame section 242 to the first frame section 241 after the first frame section 241 has been installed is that the final position of the second frame section 242 can be adjusted to compensate for any misalignment of the first frame section 241 that may have occurred during installation of the first frame section 242. In other embodiments, however, the first frame section 241 can be attached to the second frame section 242 first, and then the frame 240 can be attached to the section 110 as a complete unit.

In another embodiment of the invention, the flange portions 231 of the stiffeners 230 can be at least partially omitted. In this embodiment, a raised portion can be formed on the skin 220 between the stiffeners 230 with an additional ply or plies of material. The raised portion can take the place of the flange portions 231 in forming the support surface 235 to which the base portion 244 of the first frame section 241 mates.

FIGS. 3A and 3B are top and end views, respectively, of a portion of a section 310 configured in accordance with another embodiment of the invention. Referring to FIGS. 3A and 3B together, the section 310 can include a plurality of first stiffeners 336 and a plurality of second stiffeners 338 attached to a skin 320. Each of the stiffeners 336 and 338 can include a raised portion 334 projecting away from the skin 320. Each of the first stiffeners 336 can further include a first flange portion 337a and an opposing second flange portion 337b that are at least generally straight. Each of the second stiffeners 338, however, can further include a plurality of first flange portions 331a and a plurality of opposing second flange portions 331b that extend outwardly from the raised portion 334 to at least proximate corresponding flange portions 337 of the adjacent first stiffeners 336. A frame (not shown) can mate to the flange portions 331 and 337 as described with reference to FIGS. 2A and 2B.

FIGS. 4A and 4B are top and end views, respectively, of a portion of a section 410 configured in accordance with a further embodiment of the invention. Referring to FIGS. 4A and 4B together, the section 410 can include a plurality of asymmetric stiffeners 450 attached to a skin 420. Each of the asymmetric stiffeners 450 can include a plurality of first flange portions 431 extending outwardly from one side of a raised portion 434, and a second flange portion 437 extending outwardly from an opposite side of the raised portion 434. The second flange portion 437 can be at least approximately straight. The first flange portions 431, however, can project outwardly from the raised portion 434 to at least proximate the corresponding second flange portion 437 of the adjacent stiffener 450. A frame (not shown) can mate to the flange portions 431 and 437 as described with reference to FIGS. 2A and 2B.

FIGS. 5A and 5B are cross-sectional end views of portions of sections 510a and 510b, respectively, configured in accordance with other embodiments of the invention. Referring first to FIG. 5A, in one aspect of this embodiment, the section 510a includes a plurality of I-section stiffeners 530a attached to a skin 520a. Each of the I-section stiffeners 530a can include a plurality of first flange portions 531a and a plurality of second flange portions 531b that are at least generally similar in structure and function to the corresponding flange portions 231 described with reference to FIGS. 2A and 2B. In another aspect of this embodiment, a frame 540a can mate to the flange portions 531 as described with reference to FIGS. 2A and 2B.

Referring next to FIG. 5B, in one aspect of this embodiment, the section 510b includes a plurality of C-section stiffeners 530b attached to a skin 520b. The C-section stiffeners 530b can include flange portions 531 that are at least generally similar in structure and function to the first flange portions 431 described with reference to FIGS. 4A and 4B. In another aspect of this embodiment, a frame 540b can mate to the flange portions 531 as described with reference to FIGS. 2A and 2B.

Other methods and systems for fabricating the sections 110 are disclosed in copending U.S. patent application Ser. No. 10/851,381, entitled "COMPOSITE SECTIONS FOR AIRCRAFT FUSELAGES AND OTHER STRUCTURES, AND METHODS AND SYSTEMS FOR MANUFACTURING SUCH SECTIONS" and filed May 20, 2004; No. 10/853,075, entitled "STRUCTURAL PANELS FOR USE IN AIRCRAFT FUSELAGES AND OTHER STRUCTURES" and filed May 25, 2004; and No. 10/819,084, entitled "STRUCTURAL PANELS FOR USE IN AIRCRAFT FUSELAGES AND OTHER STRUCTURES" and filed Apr. 2, 2004; each of which is incorporated by reference.

II. Manufacturing Composite Sections

Figure 6:
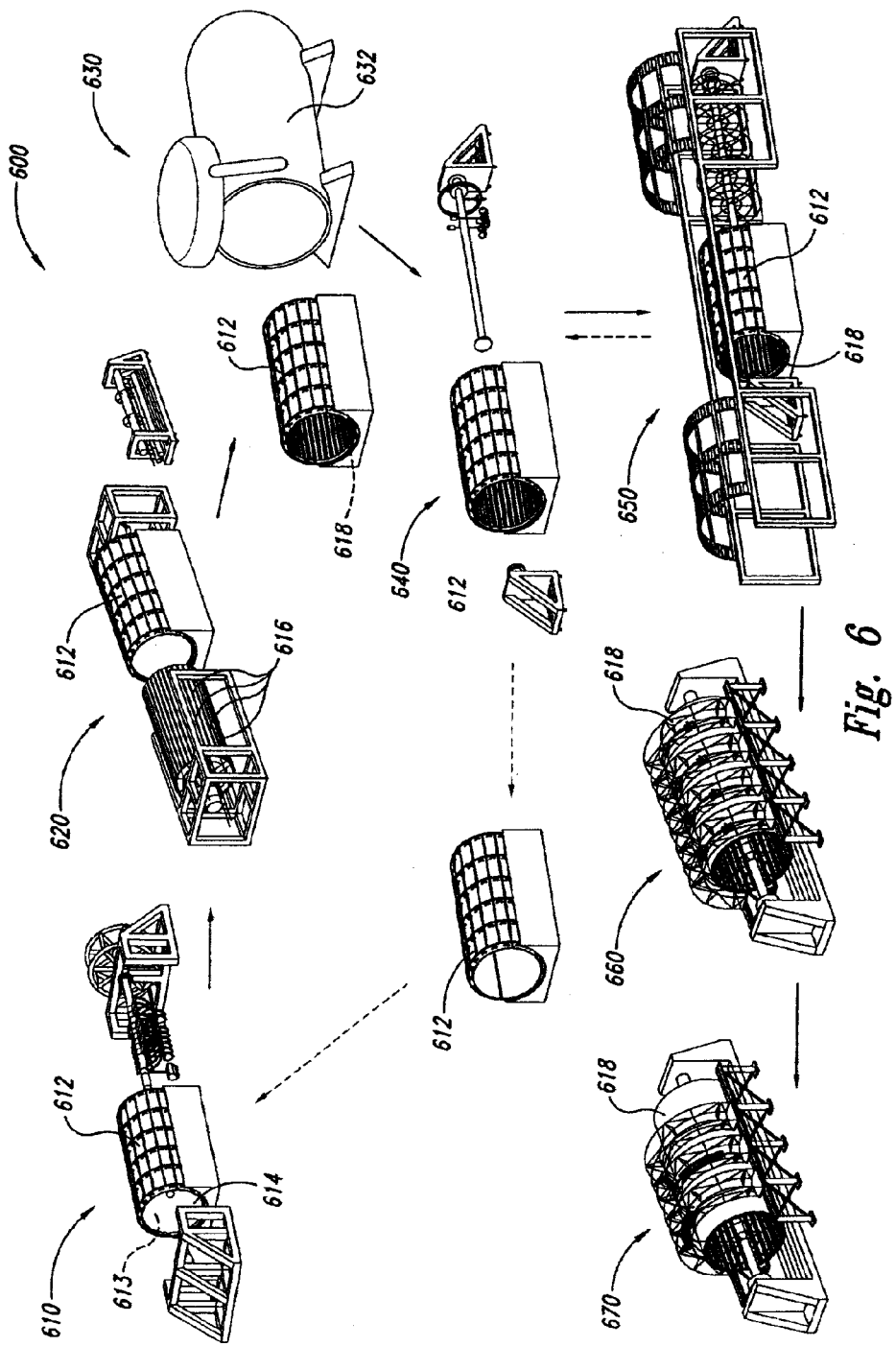
FIG. 6 is a partially schematic isometric view of a composite section manufacturing system configured in accordance with an embodiment of the invention.

FIG. 6 is a partially schematic isometric view of a composite section manufacturing system 600 ("manufacturing system 600") configured in accordance with an embodiment of the invention. The manufacturing system 600 can include a plurality of manufacturing cells or stations for fabricating one-piece composite sections that are at least generally similar in structure and function to the fuselage sections 110 described with reference to FIGS. 1-5B. For example, the manufacturing system 600 can include a skin lay-up station 610, a stiffener lay-up station 620, and a curing station 630. In the skin lay-up station 610, composite materials are laminated on an inside mold surface 613 of a lay-up mandrel 612 to form a skin lay-up 614. From there, the lay-up mandrel 612 proceeds to the stiffener lay-up station 620 where a plurality of stiffeners 616 are positioned on the skin 614 inside the lay-up mandrel 612. The skin 614 and the stiffeners 616 are then vacuum-bagged before the lay-up mandrel 612 proceeds on to the curing station 630. At the curing station 630, the lay-up mandrel 612 is positioned in an autoclave 632 to cure the skin/stiffener combination (identified hereinafter as the "shell 618").

From the curing station 630, the lay-up mandrel 612 proceeds to a Debag station 640 where the bagging materials are removed, and then to a transfer station 650. At the transfer station 650, the cured shell 618 is removed from the lay-up mandrel 612 and transferred to a trim station 660. Window cutouts and other trim operations are carried out at the trim station 660 before the shell 618 proceeds to a non-destructive evaluation (NDE) station 670 for acceptance testing. After acceptance testing, the shell 618 can proceed to other stations (not shown) for installation of other structures (e.g., frames, floors, windows, etc.) and systems before final assembly into a complete fuselage.

The configuration of manufacturing stations shown in FIG. 6 is but one arrangement that can be used to manufacture fuselage sections. In other embodiments, other manufacturing sequences and/or other manufacturing stations can be used in place of or in addition to one or more of the manufacturing stations illustrated in FIG. 6. Operations shown as being performed at a single station might be broken into multiple stations doing subtasks, respectively, or illustrated stations might be combined so that what are shown as separate subtasks are done at a single work location.

Figure 7B:
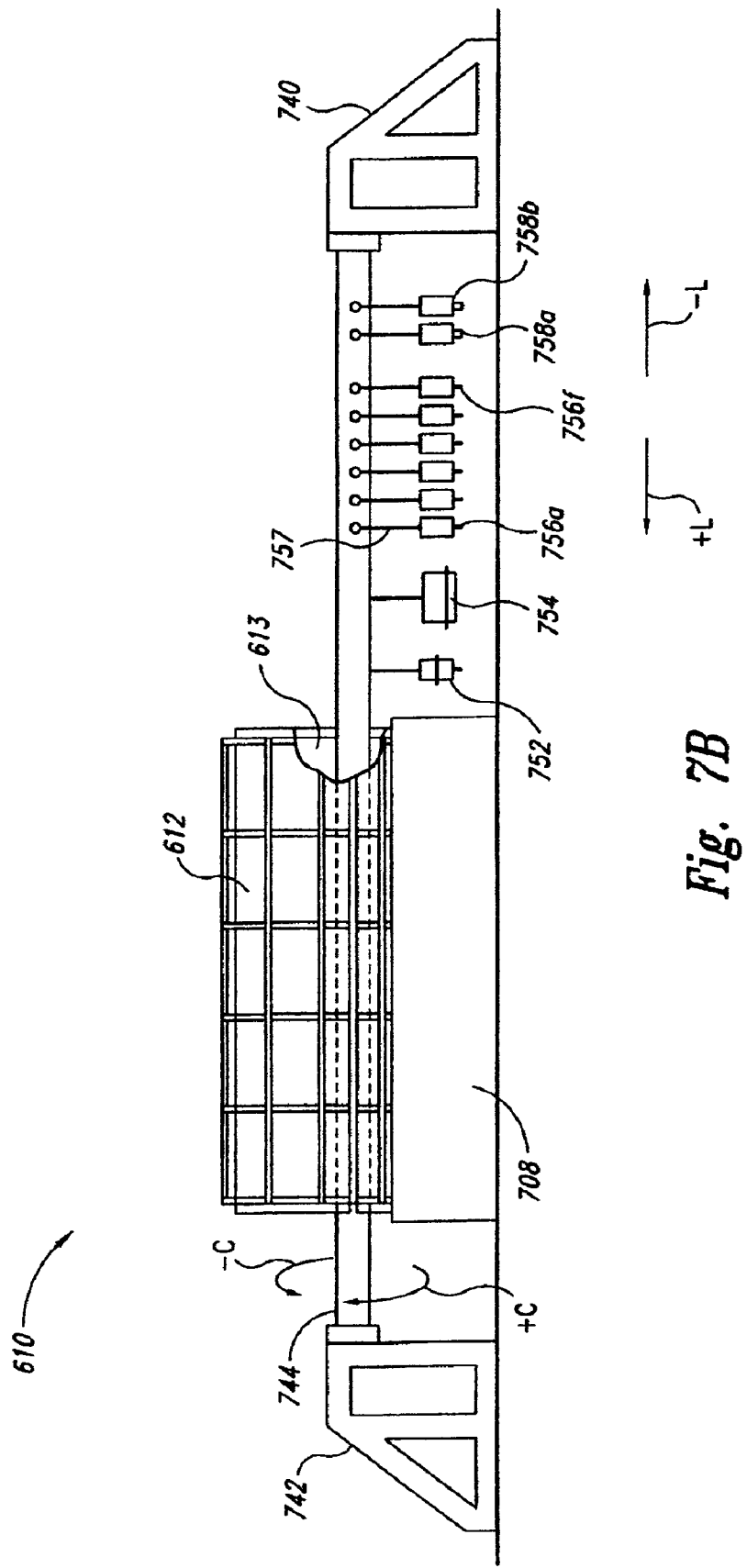
FIG. 7B is an enlarged, partially schematic side view of the skin lay-up station, configured in accordance with embodiments of the invention.

FIG. 7A is an enlarged, partially schematic isometric view of the skin lay-up station 610 of FIG. 6 with the lay-up mandrel 612 removed for clarity. FIG. 7B is an enlarged, partially schematic side view of the skin lay-up station 610 for the purpose of describing a skin lay-up process in accordance with an embodiment of the invention. Referring to FIGS. 7A and 7B together, in one aspect of this embodiment, the skin lay-up station 610 includes a first stanchion 740 spaced apart from a second stanchion 742. The first stanchion 740 supports an equipment support member or boom 744 that extends outwardly from the first stanchion 740 toward the second stanchion 742. The first stanchion 740 is longitudinally movable in both +L and −L directions to position the equipment boom 744 as needed relative to the lay-up mandrel 612. When the equipment boom 744 is fully inserted through the lay-up mandrel 612, a distal end 745 is supported by a journal 746 on the second stanchion 742.

The equipment boom 744 can support a plurality of apparatuses for applying composite materials to the inside mold surface 613 of the lay-up mandrel 612. In the illustrated embodiment, these apparatuses include a tackifier dispenser 752, a fabric dispenser 754, a plurality of tape lay-up machines 756 (identified individually as tape lay-up machines 756*a*-*f*), and a plurality of doubler lay-up machines 758 (identified individually as doubler lay-up machines 758*a*-*b*). All of these apparatuses are configured to move longitudinally in both the +L and −L directions along the equipment boom 744. In addition, these apparatuses are further configured to rotate circumferentially in both +C and −C directions relative to the boom axis. A counterbalance 752 can be used to counterbalance one or more of the apparatuses supported by the equipment boom 744 on the opposite side of the first stanchion 740 if needed to longitudinally and/or rotationally offset the weight of these apparatus as they move about on the equipment boom 744.

The tackifier dispenser 752 is configured to dispense a thinned epoxy resin or other tacky agent (i.e., "tackifier") onto the mold surface 613 prior to laying down composite material. The tackifier helps the first ply of material temporarily adhere to the mold surface 613 during the lay-up process. As mentioned above, the tackifier dispenser 752 can move longitudinally in the +/−L directions along the equipment boom 744 to dispense tackifier. In addition, the tackifier dispenser 752 can also rotate circumferentially about the equipment boom 744 in the +/−C directions.

The fabric dispenser 754 is configured to apply composite fabric to the mold surface 613. In one embodiment, for example, the fabric dispenser can dispense pre-impregnated, bidirectional woven cloth, such as graphite-epoxy cloth, having a trimmed width of about 42 inches. In other embodiments, the fabric dispenser can lay down other types of composite materials having other widths and/or other weave patterns. Like the tackifier dispenser 752, the fabric dispenser 754 can rotate circumferentially about the equipment boom 744 to apply fabric to the mold surface 613 in a spiral pattern or as a series of circumferential sections. In selected embodiments, however, it may also be advantageous to apply fabric in a longitudinal pattern. In such embodiments, the fabric dispenser 754 can be pivoted 90 degrees in a P direction as shown in FIG. 7A to orient the fabric dispenser 754 parallel to the equipment boom 744. In this orientation, the fabric dispenser 754 can apply fabric to the mold surface 613 in the longitudinal +/−L directions by translating back and forth on the equipment boom 744.

The tape lay-up machines 756 can include commercially available tape heads configured to apply preimpregnated tape to the mold surface 613. Each of the tape lay-up machines 756 is supported on a separate gantry rail 757. The gantry rails 757 allow the tape lay-up machines 756 to move independently of each other in the +/−C directions. The tape lay-up machines 756 can also move independently of each other in the +/−L directions. In one embodiment, the tape lay-up machines can apply tape having a width from about 3 inches to about 12 inches, e.g., about 6 inches. In other embodiments, the tape can have other widths depending on various factors including coverage, stearability, etc. If the tape is six inches wide, then the individual tape lay-up machines 756 can be longitudinally offset from each other in six-inch increments. This spacing enables the plurality of tape lay-up machines 756 to apply a continuous layer of tape by first applying tape circumferentially at one longitudinal station, and then moving six inches to the next longitudinal station.

In another embodiment, the individual tape lay-up machines 756 can also be circumferentially staggered with respect to each other. In this embodiment, the tape lay-up machines 756 can then be moved parallel to the equipment boom 744 to apply tape to the lay-up in a longitudinal pattern. In the illustrated embodiment, the gantry rails 757 do not extend a full 360 degrees around the equipment boom 744. Accordingly, the gantry rails 757 can be configured to rotate circumferentially in the +/−C directions as necessary to provide tape head access to the entire mold surface 613. Additionally, the equipment boom 744 can also be configured to rotate in the +/−C directions as necessary to achieve this goal.

Although six of the tape lay-up machines 756 are shown in FIGS. 7A-B for purposes of illustration, in other embodiments, more or fewer tape lay-up machines can be used depending on a number of different factors. For example, if higher speed is desired, then more tape lay-up machines can be employed. In contrast, if speed is less important, then fewer tape lay-up machines 756 can be used.

Each of the doubler lay-up machines 758 is supported on a separate gantry rail 757 in the same manner as the tape lay-up machines 756 and, accordingly, can move in similar directions. In the illustrated embodiment, the doubler lay-up machines 758 include commercially available cassette heads configured to place pre-cut doublers and/or doubler segments onto the lay-up inside the lay-up mandrel 612. In one embodiment, the doubler lay-up machines 758 can be loaded with precut doublers as follows: First, tape is laid down on a work table and trimmed to a desired doubler size. The tape is then re-rolled back onto a cassette. Next, the cassette is loaded onto one of the doubler lay-up machines 758. When a doubler is needed during the lay-up process (for example, for placement around a window cutout), the doubler lay-up machines 758 move into position and dispense the doubler at the desired location. In this manner, doublers can be interleaved with tape plies during the lay-up process. Although two doubler lay-up machines 758 are illustrated in FIGS. 7A-B, in other embodiments, more or fewer doubler lay-up machines can be used as required.

As shown in FIG. 7B, the lay-up mandrel 612 is supported in a fixture 708. The fixture 708 can rotate the lay-up mandrel 612 in the +/−C directions as required to facilitate any of the lay-up operations described above.

To lay-up a skin on the mold surface 613, the lay-up mandrel 612 is moved into the skin lay-up station 610 and aligned with the equipment boom 744. Next, the equipment boom 744 is inserted through the lay-up mandrel 612 and engaged with the second stanchion 742. The tackifier dispenser 752 then moves into the lay-up mandrel 612 and applies tackifier to the mold surface 613. Once tackifier has been applied, the tackifier dispenser 752 moves out of the lay-up mandrel 612 in the +L direction and is parked next to the second stanchion 742.

Next, the fabric dispenser 754 moves into the lay-up mandrel 612 and lays down an OML ply of fabric on the mold surface 613. As explained above, after applying a circumferential row of fabric at one longitudinal station, the fabric dispenser 754 can move a preset increment in the longitudinal direction to apply the next row of fabric. In addition or alternatively, the fabric dispenser 754 can pivot in the P direction (FIG. 7A) to lay down fabric in longitudinal rows. In the foregoing manner, the fabric dispenser 754 can lay down a complete OML ply of fabric on the mold surface 613. If additional plies of fabric are desired, they can be laid down over the OML ply in the manner described above. After the fabric dispenser 754 has laid down the desired number of plies, it moves out of the lay-up mandrel 612 in the +L direction and is parked next to the tackifier dispenser 752 by the second stanchion 742.

The tape lay-up machines 756 move into the lay-up mandrel 612 after the fabric dispenser 754. As explained above, tape can be applied to the fabric lay-up by movement of the tape lay-up machines 756 in both the circumferential and longitudinal directions. Doublers can be applied in desired locations by temporarily parking the tape lay-up machines 756 next to the second stanchion 742 and moving one or more of the doubler lay-up machines 758 into the lay-up mandrel 612. In this manner, the tape lay-up machines 756 and the doubler lay-up machines 758 can move in and out of the lay-up mandrel as required to interleave the doublers with the tape plies.

Once the tape and doubler plies have been laid up, the doubler lay-up machines 758 and the tape lay-up machines 756 are moved out of the lay-up mandrel 612 in the −L direction and parked next to the first stanchion 740. The fabric dispenser 754 then moves back into the lay-up mandrel 612 to lay an IML ply of fabric on the lay-up. During any part of the lay-up process described above, the fixture 708 can rotate the lay-up mandrel 612 in the +/−C directions as required to facilitate application of the various composite materials. Once the lay-up process is complete, the equipment boom 744 is extracted and the lay-up mandrel 612 is moved to the stiffener lay-up station 620 (FIG. 6).

One feature of the lay-up process described above is that all of the composite materials are applied directly to the inside mold surface 613 of the lay-up mandrel 612. One advantage of this feature is that it eliminates the need for a winding mandrel or other male tool having an exterior mold surface. In addition, it also eliminates the need for outer caul plates or other devices to provide the finished part with a smooth exterior surface. The process described above also allows direct doubler placement.

The lay-up process described above is not limited to the application of composite fabric, tape, and/or doublers. Accordingly, in other embodiments, other types of composite materials can be applied to the mold surface 613 to form the skin lay-up. Such materials can include, for example, fiber tows (e.g., 0.25-0.50 inch wide fiber tows) applied using suitable fiber placement tools and methods. The fiber placement tools can be moved into the lay-up mandrel 612 on the equipment boom 744 using methods similar to those described above for the fabric dispenser 754 and the tape lay-up machines 756.

Figure 8A:
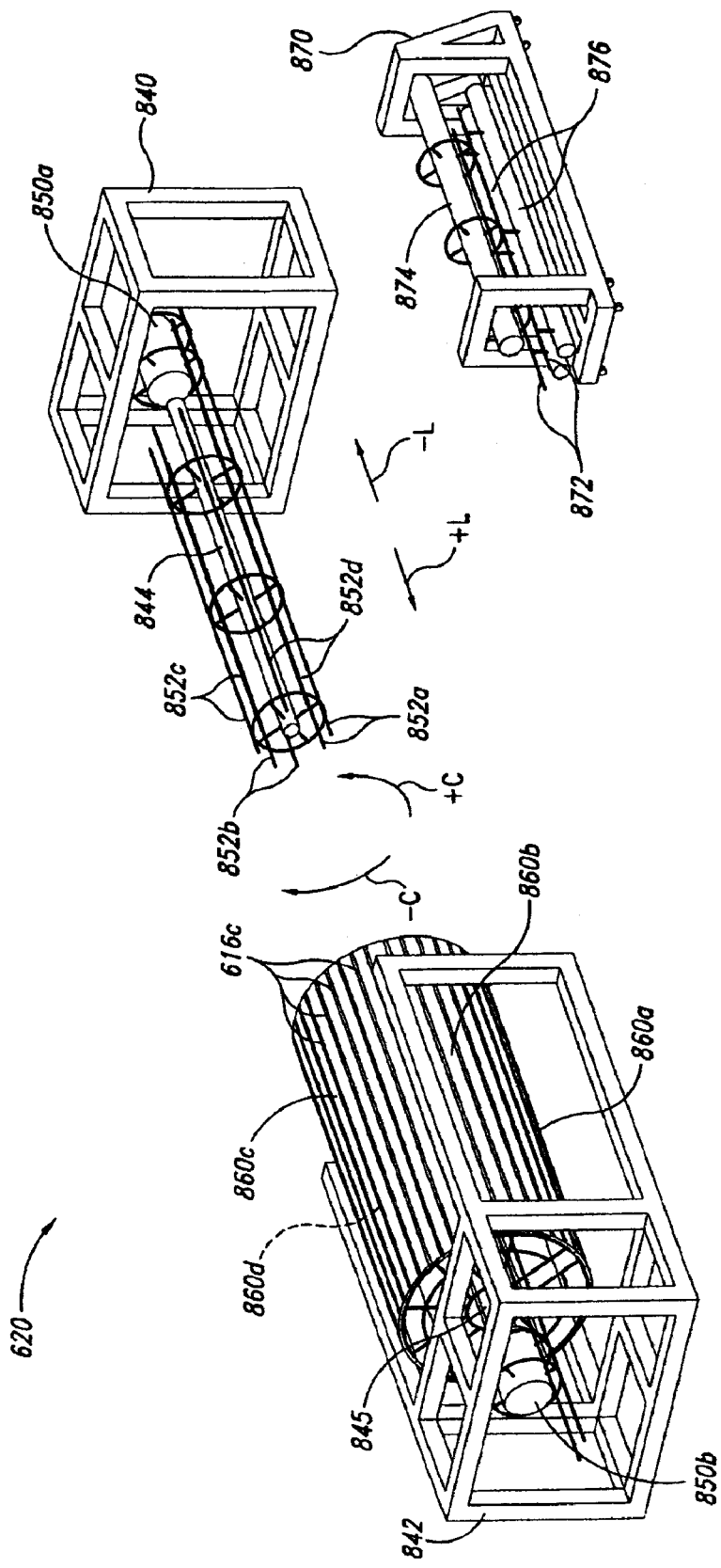
FIG. 8A is an enlarged, partially schematic isometric view of a stiffener lay-up station of FIG. 6.
Figure 8B:
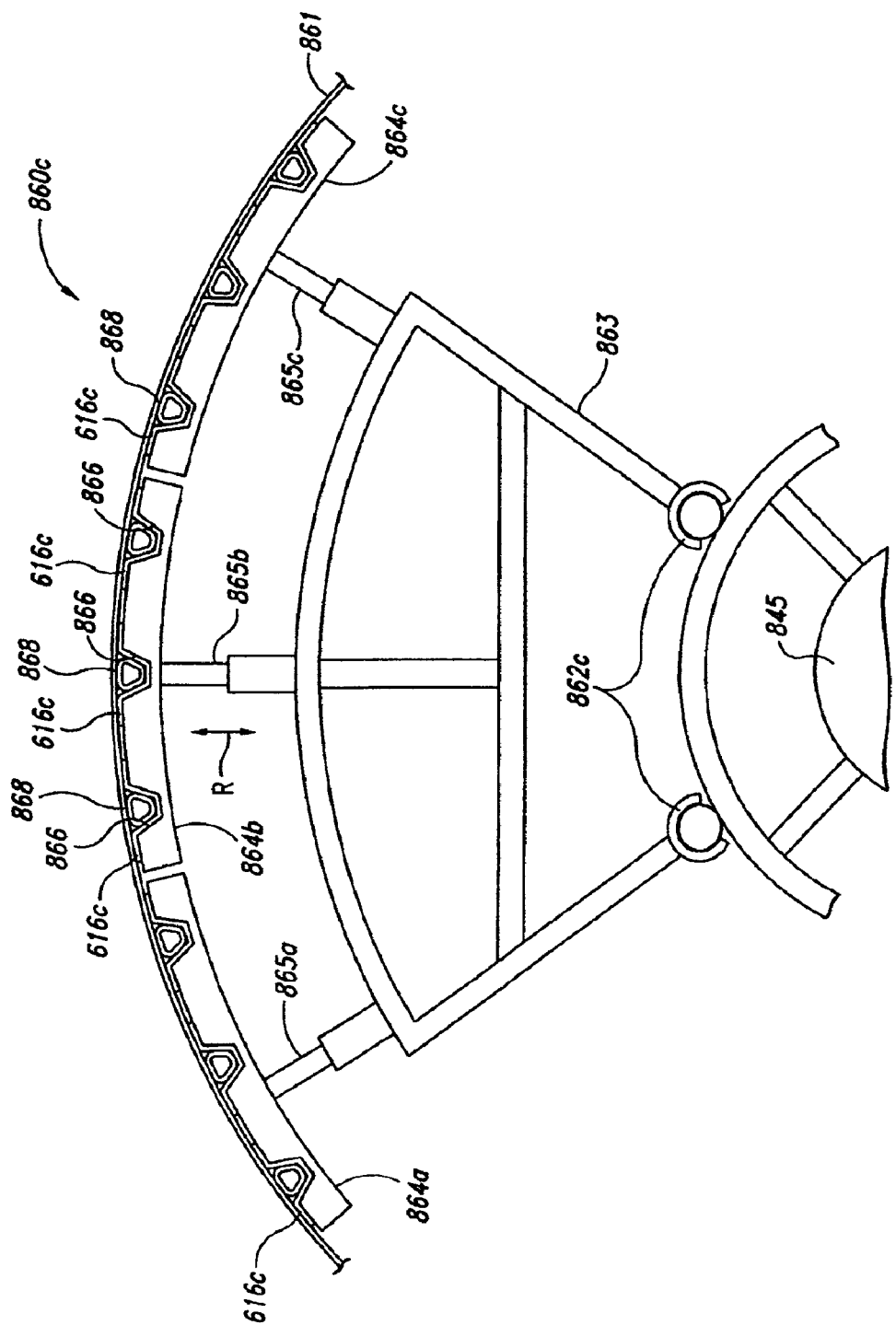
FIG. 8B is an enlarged, cross-sectional end view of a stiffener placement tool that can be used in the stiffener lay-up station.
Figure 8C:
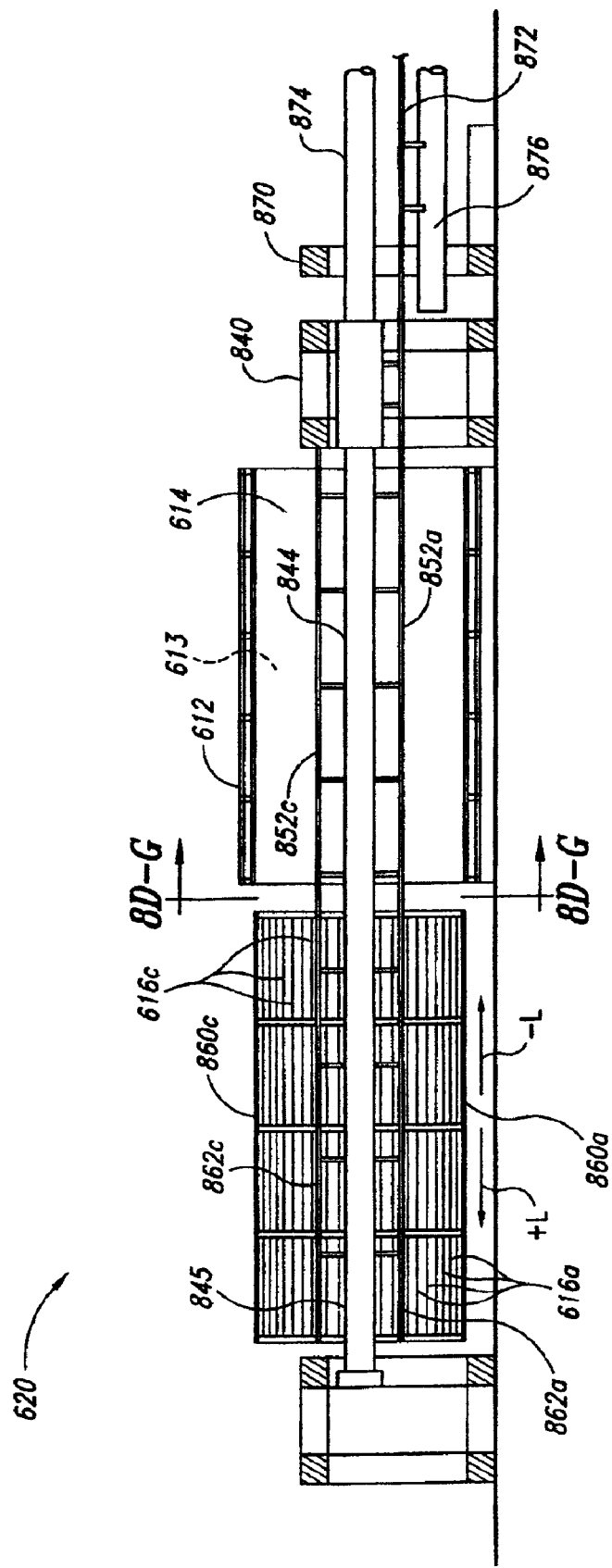
FIGS. 8C-8G are schematic views illustrating various steps in a method of placing stiffeners on a skin lay-up in accordance with embodiments of the invention.

FIG. 8A is an enlarged, partially schematic isometric view of the stiffener lay-up station 620 of FIG. 6 configured in accordance with an embodiment of the invention. The lay-up mandrel 612 is not shown in FIG. 8A for purposes of clarity. FIG. 8B is an enlarged, cross-sectional end view of a stiffener placement tool 860c that is used in the stiffener lay-up station 620. FIG. 8C is a partially schematic, cross-sectional side view, and FIGS. 8D-G are partially schematic end views, of the stiffener lay-up station 620 illustrating various steps in a method of placing stiffeners on a skin lay-up in accordance with an embodiment of the invention. Referring first to FIG. 8A, the stiffener lay-up station 620 includes a first stanchion 840 that is movable relative to a second stanchion 842. The first stanchion 840 supports an equipment support member or mandrel boom 844 that can be rotated in the +/−C directions by a first drive assembly 850a. The mandrel boom 844 supports a plurality of utility rails 852 (identified as utility rail pairs 852a-d).

The second stanchion 842 supports a stiffener boom 845 that is rotatable in the +/−C directions by a second drive assembly 850b. The stiffener boom 845 supports a plurality of stiffener placement tools 860 (identified individually as stiffener placement tools 860a-d). Each of the stiffener placement tools 860 carries a set of the stiffeners 616 (identified individually as stiffener sets 616a-d) that are positioned on the skin 614 (FIG. 6) during the stiffener lay-up process. Further, each of the stiffener placement tools 860 can be independently transferred from the stiffener boom 845 to the mandrel boom 844 for stiffener placement.

The stiffener lay-up station 620 further includes a bag assist tool 870. The bag assist tool 870 includes a bag boom 874 which carries a plurality of vacuum bag dispensers 876 on bag support rails 872. The bag assist tool 870 is configured to be aligned with the first stanchion 840 so that one or more of the vacuum bag dispensers 876 can be transferred from the bag support rails 872 to an aligned pair of the utility rails 852.

FIG. 8B is an enlarged, cross sectional end view of the third stiffener placement tool 860c of FIG. 8A configured in accordance with an embodiment of the invention. In one aspect of this embodiment, the stiffener placement tool 860c includes a plurality of stiffener positioners 864 (identified individually as stiffener positioners 864a-c) attached to a subframe 863 by a plurality of actuators 865 (identified individually as actuators 865a-c). The subframe 863 slidably mounts to a pair of corresponding stiffener support rails 862 which are carried in turn by the stiffener boom 845. The other stiffener placement tools 860a, b and d are at least generally similar in structure and function to the third stiffener placement toot 860c.

Each of the stiffener positioners 864 includes a plurality of holding portions 866 configured to receive and support the third set of stiffeners 616c during the placement process. In the illustrated embodiment, the stiffeners 616c are hat section stiffeners and the holding portions 866 are configured accordingly. In other embodiments, however, the stiffener positioners 864 can be configured to support other types of stiffeners for placement on the skin 614. Such stiffeners include, for example, I-section stiffeners, C-section stiffeners, Z-section stiffeners, etc.

The stiffeners 616c can be uncured, partially cured, or fully cured when they are positioned in the holding portions 866. If uncured or partially cured, then mandrels 868 can be positioned inside the stiffeners 616c to keep the stiffeners 616c from collapsing under pressure during the subsequent vacuum-bagging and curing cycles. In this regard, the mandrels 168 can be inflatable mandrels that are deflated after the cure cycle for removal. Alternatively, the mandrels 868 can be "fly-away" mandrels or rigid or semi-rigid mandrels that can be physically or chemically removed after the cure cycle. If the stiffeners 616c are fully cured when they are positioned in the holding portions 866, then internal support during the subsequent vacuum-bagging and curing cycles may not be needed. However, additional adhesive may be required to bond the cured stiffeners 616c to the skin 614 during the curing cycle. Once the mandrels 868 have been installed in each of the stiffeners 616c, a temporary strap 861 can be placed over the stiffeners to temporarily hold them in place prior to installation inside the lay-up mandrel 612. In one embodiment, the straps 861 can be made from Teflon or a Teflon-coated material, such as Armalon.

As described in greater detail below with reference to FIG. 8C, the stiffener placement tool 860c is able to move in the +/−L directions on the stiffener support rails 862c to position the stiffeners 616c inside the lay-up mandrel 612. Once inside the lay-up mandrel 612, the temporary strap 861 can be removed and the actuators 865 can be extended to press the stiffeners 616c against the skin 614. In one embodiment, the actuators 865 can include air cylinders that can be controlled to extend and retract axially in direction R. In other embodiments, other apparatuses can be used to move the stiffeners 616c radially outwardly toward the mold surface 613. Such apparatuses can include, for example, various mechanical, pneumatic, electromechanical, and hydraulic devices.

Referring to FIG. 8C, the lay-up mandrel 612 is aligned with the stiffener boom 845, and the mandrel boom 844 is inserted through the lay-up mandrel 612 and coupled to the stiffener boom 845. The bag assist tool 870 is positioned behind the first stanchion 840 so that the bag boom 874 is aligned with the mandrel boom 844. In the foregoing arrangement, each of the stiffener support rails 862 on the stiffener boom 845 is aligned with a corresponding utility rail 852 on the mandrel boom 844. In addition, each of the bag support rails 872 on the bag boom 874 is also aligned with a corresponding utility rail 852. This alignment enables the stiffener positioning tools 860 and the vacuum bag dispensers 876 to move in and out of the lay-up mandrel 612 on the utility rails 852.

Figure 8D:
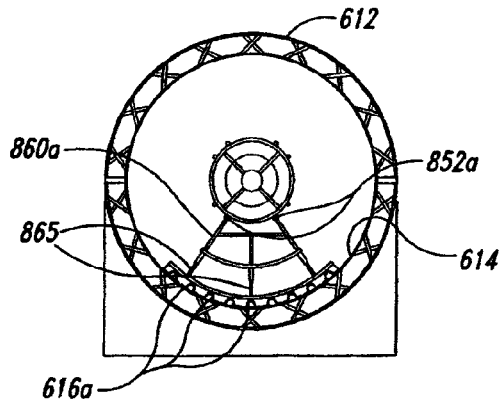

FIGS. 8D-G are cross-sectional end views of the lay-up mandrel 612 taken along line 8D-G-8D-G in FIG. 8C for the purpose of describing various steps in a method for placing the stiffeners 616 on the skin 614. Referring first to FIGS. 8B-D together, the first stiffener placement tool 860*a* is transferred from the first pair of stiffener support rails 862*a* to the first pair of utility rails 852*a* to move the first stiffener placement tool 860*a* into the lay-up mandrel 612. Once the first stiffener placement tool 860*a* is fully positioned in the lay-up mandrel 612, the actuators 865 are extended to position the first set of stiffeners 616*a* just above the skin 614. At this point, the straps 861 (FIG. 8B) which were temporarily holding the stiffeners 616*a* in place can be removed. Next, the actuators 865 are further extended to press the stiffeners 616*a* firmly against the skin 614. The actuators 865 can then be retracted, leaving the stiffeners 616*a* (and the associated mandrels 868) in position on the skin 614. The first stiffener placement tool 860*a* can then be moved back onto the stiffener boom 845 via the first pair of stiffener support rails 862*a*.

Figure 8E:
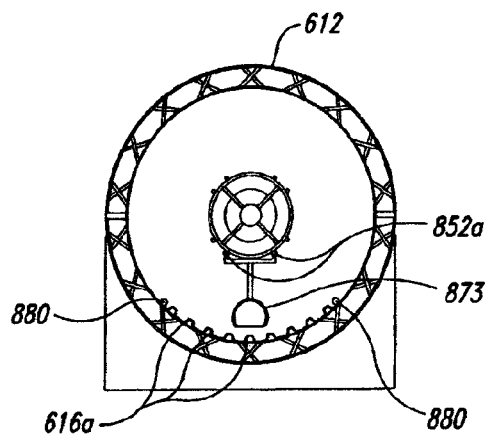

Once the first stiffener placement tool 860*a* has been removed from the lay-up mandrel 612, a release layer (not shown) can be laid over the first set of stiffeners 616*a*, and a breather layer (also not shown) can be laid over the release layer, as is standard practice. Suitable release layers include fluorinated ethylene-propylene (FEP), and virtually any loosely woven or similar material can be used to provide the continuous vacuum path of the breather layer. As shown in FIG. 8E, one or more work platforms 873 can be moved into the lay-up mandrel 612 on the utility rails 852*a* to facilitate manual installation of the release and breather layers. At this time, temporary vacuum strips 880 are positioned on the skin 614 on each side of the first set of stiffeners 616*a*. The temporary vacuum strips 880 run the full length of the lay-up mandrel 612. The structure and function of the temporary vacuum strips 880 are described in greater detail below with reference to FIGS. 9A-B.

Figure 8F:
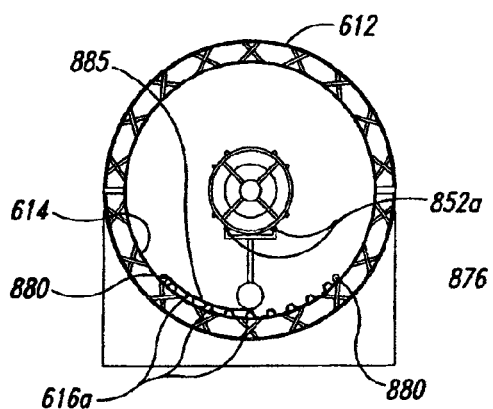

After the temporary vacuum strips have been installed, one of the vacuum bag dispensers 876 is moved into the lay-up mandrel 612 on the utility rails 852*a*, as shown in FIG. 8F. Bagging material 885 is then manually positioned over the first set of stiffeners 616*a* on the breather layer. The bagging material 885 is sealed around the periphery of the first set of stiffeners 616*a* by means of the temporary vacuum strips 880 on the sides, and by other sealing means (e.g., vacuum bag sealing tape) on the ends of the lay-up mandrel 612. The volume beneath the bag material 885 is then evacuated to press the stiffeners 616*a* against the skin 614.

Figure 8G:
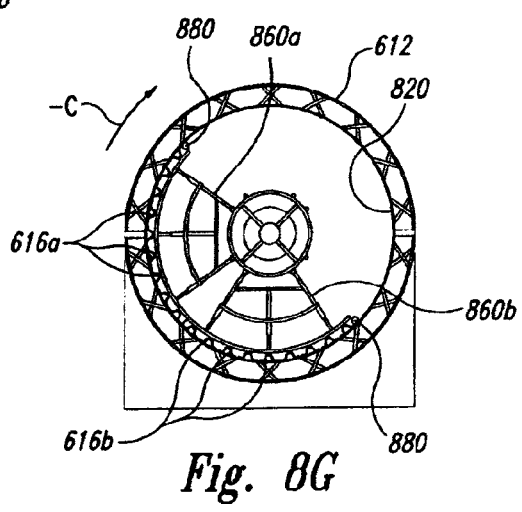

Referring next to FIG. 8G, once the bagging material 885 has been evacuated, the first stiffener placement tool 860*a* is reinserted into the lay-up mandrel 612 and repositioned over the first set of stiffeners 616*a*. The actuators 865 are then extended to hold the stiffeners 616*a* in place against the skin 614 as a back-up for the vacuum pressure. Next, the lay-up mandrel 612 is rotated 90 degrees in the −C direction so that the second stiffener placement tool 860*b* can be inserted into the lay-up mandrel 612. The second set of stiffeners 616*b* is then installed in the same manner described for the first set of stiffeners 616*a*. Prior to installing the associated bagging material, however, the temporary vacuum strip 880 between the first set of stiffeners 616*a* and the second set of stiffeners 616*b* is removed and the bags are sealed together. The foregoing processes are then repeated for the third set of stiffeners 616*c* and the fourth set of stiffeners 616*d* until all of the stiffeners 616 have been positioned in the lay-up mandrel 612 and the entire lay up has been vacuum-bagged. The process of sealing the bag sections together is described in more detail below with reference to FIGS. 9A-B.

Figure 9A:
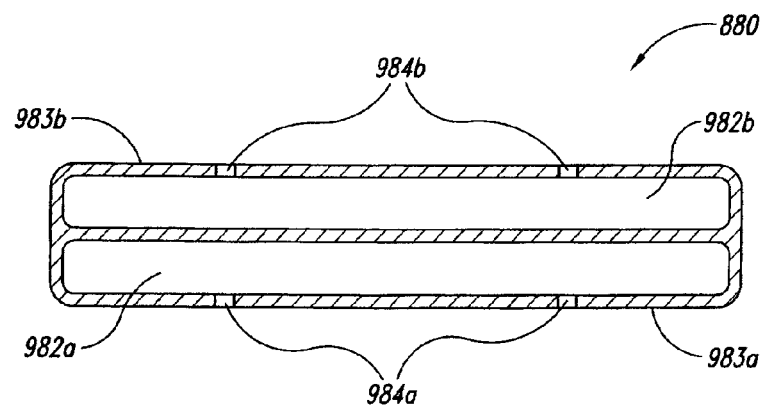
FIG. 9A is an enlarged, cross-sectional end view of a temporary vacuum strip configured in accordance with an embodiment of the invention.
Figure 9B:
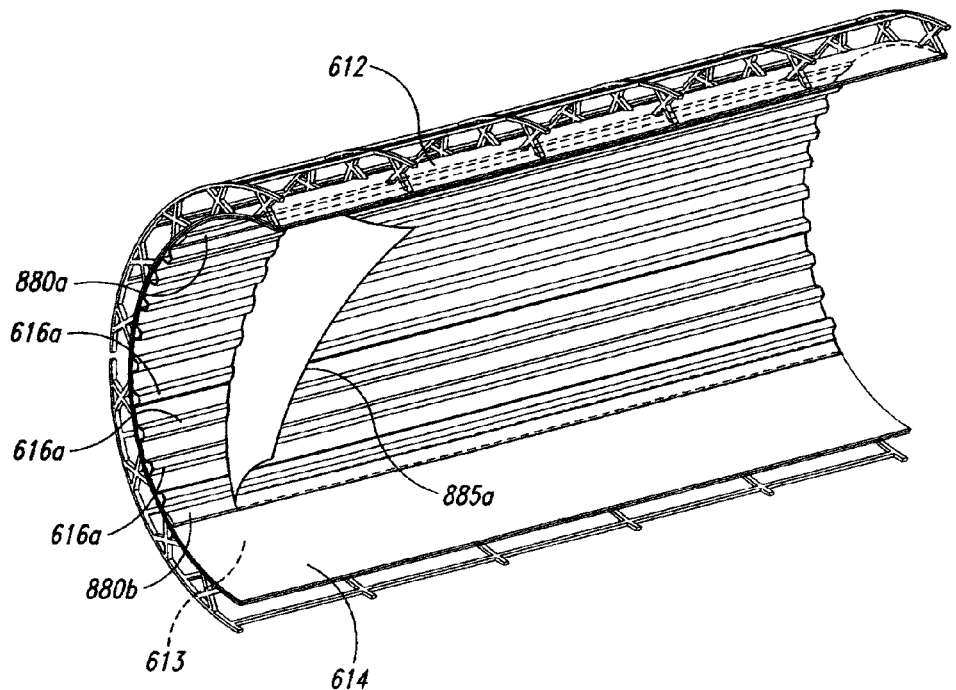
FIG. 9B is a partially cutaway isometric view of a lay-up mandrel for the purpose of describing a method for vacuum-bagging a lay-up with the temporary vacuum strip of FIG. 9A.

FIG. 9A is an enlarged, cross-sectional end view of one of the temporary vacuum strips 880 configured in accordance with an embodiment of the invention. FIG. 9B is a partially cut-away isometric view of the lay-up mandrel 612 for the purpose of describing a method for vacuum-bagging a lay-up with the temporary vacuum strips 880 in accordance with another embodiment of the invention. Referring first to FIG. 9A, each of the temporary vacuum strips 880 is divided into a first chamber 982*a* and a second chamber 982*b*. A first plurality of holes 984*a* extend through a first sidewall 983*a* of the first chamber 982*a*, and a second plurality of holes 984*b* extend through a second sidewall 983*b* of the second chamber 982*b*. In the illustrated embodiment, the temporary vacuum strips 880 can be made from an elastic material such as rubber, polyurethane, plastic, etc. that flexes under pressure but returns to its original shape when the pressure is removed.

Referring next to FIG. 9B, prior to installation of the bagging material 885, the temporary vacuum strips 880 (identified individually as a first temporary vacuum strip 880*a* and a second temporary vacuum strip 880*b*) are positioned outboard of the first set of stiffeners 616*a* with the first chambers 982*a* (FIG. 9A) facing the skin 614. The first chambers 982*a* are then evacuated, creating a suction force which holds the temporary vacuum strips 880 in position against the skin 614. Next, the bagging material 885 (identified as a first portion of bagging material 885*a* for ease of reference) is laid over the stiffeners 616 and the temporary vacuum strips 880. (Release and breather layers are not shown in FIG. 9A for purposes of clarity.) Once the bagging material 885 has been properly positioned, the second chambers 882*b* of the vacuum strips 880 can be evacuated to seal the bagging material 885 against the temporary vacuum strips 880. Although not illustrated in FIG. 9B, the bagging material 885 can be sealed at the respective ends of the lay-up mandrel 612 using additional temporary vacuum strips 880, conventional sealing tape, or an equivalent medium. Once the bagging material 885 has been fully sealed around the first set of stiffeners 616*a*, it can be evacuated to press the stiffeners 616*a* against the skin 614.

After the first set of stiffeners 616*a* has been vacuum-bagged, the second set of stiffeners 616*b* (FIG. 8G) can be installed in the lay-up mandrel 612 adjacent to the first set 616*a* on the opposite side of the second temporary vacuum strip 880*b*. To install a second portion of bagging material 885 (not shown) over the second set of stiffeners 616*b*, a third temporary vacuum strip 880 (also not shown) is installed on the skin 614 on the side of the second set of stiffeners 616*b* opposite to the second temporary vacuum strip 880*b*. Next, the second portion of bagging material 885 is sealed to the third temporary vacuum strip 880 in the manner described above. The first portion of bagging material 885*a* is then released from the second temporary vacuum strip 880*b*, and the second temporary vacuum strip 880*b* is removed from the skin 614 by releasing the suction in the corresponding chambers 982. Removing the second temporary vacuum strip 880*b* enables the second portion of bagging material 885 to be sealed to the first portion of bagging material 885*a* (with, for example, conventional sealing tape) to provide a continuous bag over the first and second stiffener sets 616a-b. The remaining stiffener sets 616c-d, and the corresponding portions of bagging material 885, can then be sequentially installed in the lay-up mandrel 612 using the steps outlined above for the first and second stiffener sets 616a-b. Accordingly, when the last portion of bagging material 885 is installed, the final temporary vacuum strip 880 can be removed from the lay-up mandrel 612 to provide a continuous vacuum bag over the entire skin/stiffener lay-up (i.e., over the entire shell 618 (FIG. 6)).

Referring momentarily back to FIG. 6, after the shell 618 has been vacuum-bagged as described with reference to FIGS. 8A-G, the lay-up mandrel 612 is moved to the curing station 630 and positioned in the autoclave 632. The shell 618 is then cured by elevating the temperature and pressure inside the autoclave 632 for a preset period of time. For example, in one embodiment, the shell 618 can be cured by raising the temperature to 350 degrees Fahrenheit and the pressure to 85 psi for a period of about two hours. In other embodiments, other curing parameters can be used depending on various factors including material type, equipment and facilities limitations, etc. In one other embodiment, for example, the shell 618 can be cured in an oven at an elevated temperature without a substantial increase in pressure. In further embodiments using appropriate materials, the shell 618 can be cured at ambient temperatures and/or ambient pressures. In yet other embodiments, temporary headers and/or other similar structures can be used to provide additional support to the shell 618 during the cure cycle to maintain, e.g., stiffener positions.

Figure 10:
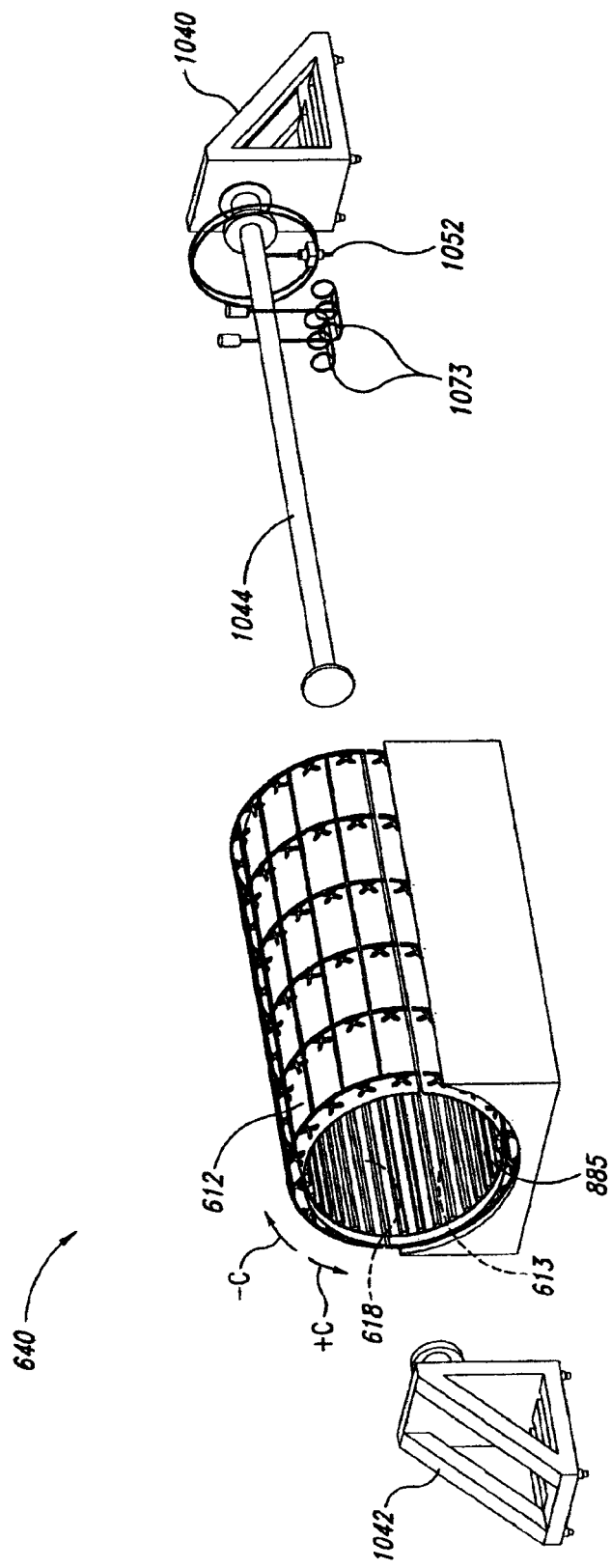
FIG. 10 is an enlarged, partially schematic isometric view of a debag station of FIG. 6 configured in accordance with an embodiment of the invention.

FIG. 10 is an enlarged, partially schematic isometric view of the debag station 640 of FIG. 6 configured in accordance with an embodiment of the invention. In one aspect of this embodiment, the debag station 640 includes a first stanchion 1040 spaced apart from a second stanchion 1042. The first stanchion 1040 supports a debag boom 1044 which in turn carries work platforms 1073 and a release agent dispenser 1052. When the lay-up mandrel 612 comes to the debagging station 640 from the autoclave 632, the debag boom 1044 is inserted through the lay-up mandrel 612 and engaged with the second stanchion 1042. Factory technicians can then enter the lay-up mandrel 612 on the work platforms 1073 to remove the bagging material 885 from the shell 618.

Once the shell 618 has been removed from the lay-up mandrel 612 at the transfer station 650 (FIG. 6), the lay-up mandrel 612 can return to the debag station 640 for the application of Frekote® or other suitable release agent. The release agent dispenser 1052 is configured to move back and forth in the +/−L directions and to rotate circumferentially in the +/−C directions to apply the release agent to the entire mold surface 613. In addition, as mentioned above, the lay-up mandrel 612 can also be rotated in the +/−C directions if needed to facilitate release agent application. The release agent is applied to the mold surface 613 before the lay-up mandrel 612 is returned to the skin lay-up station 610 (FIG. 6) to prevent the next skin lay-up from bonding to the mold surface.

FIG. 11A is an enlarged, partially schematic isometric view of the transfer station 650 of FIG. 6 configured in accordance with an embodiment of the invention. In one aspect of this embodiment, the transfer station 650 includes a header boom 1144 cantilevered from a first stanchion 1140. The header boom 1144 supports a plurality of circumferentially expandable headers 1152 configured to fit inside the lay-up mandrel 612 (not shown in FIG. 11A). The first stanchion 1140 is movable in the +/−L directions to engage/disengage the header boom 1144 with a second stanchion 1142. In another aspect of this embodiment, the transfer station 650 further includes a first gantry 1190a and a second gantry 1190b. The gantries 1190 are configured to lift various portions of the lay-up mandrel 612 and/or the header boom 1144, and move them back and forth in the +/−L directions on tracks 1194.

Figure 11E:
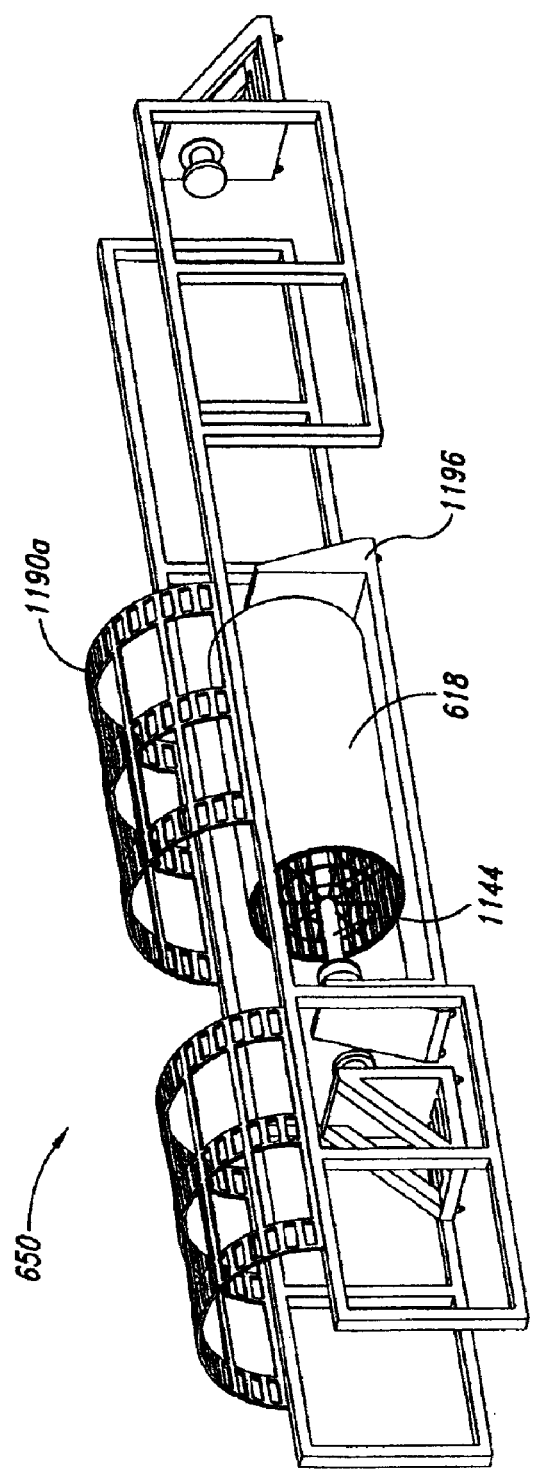

FIGS. 11B-E are partially schematic isometric views illustrating a method for removing the shell 618 from the lay-up mandrel 612 at the transfer station 650. To facilitate this process, the lay-up mandrel 612 is separable into a first mandrel half 1112a and a second mandrel half 112b. Referring first to FIG. 11B, the lay-up mandrel 612 is aligned with the second stanchion 1142, and the header boom 1144 is inserted through the lay-up mandrel 612 and engaged with the second stanchion 1142. The headers 1152 are then expanded outwardly against the shell 618 to provide support. Next, the second gantry 1190b is moved in the −L direction and positioned over the lay-up mandrel 612. Lifting devices (not shown) extend downwardly from the second gantry 1190b and lift the first mandrel half 1112a off of the second mandrel half 1112b. The second gantry 1190b then moves back in the +L direction and parks in the position shown in FIG. 11B.

Referring now to FIG. 11C, the first gantry 1190a moves in the +L direction into position over the shell 618. Lifting devices then extend downwardly from the first gantry 1190a and engage the ends of the header boom 1144. The first gantry 1190a then lifts the header boom 1144 upwardly and out of the second mandrel half 1112b. Referring next to FIG. 11D, the first gantry 1190a then moves the header boom 1144 in the −L direction to, make room for the second gantry 1190b. The second gantry 1190b moves into position and lowers the first mandrel half 1112a downwardly onto the second mandrel half 1112b. The two mandrel halves 1112 are then reattached, and the lay-up mandrel 662 is returned to the debag station 640 for application of release agent as described with reference to FIG. 10. As shown in FIG. 11E, the first gantry 1190a then lowers the header boom 1144 down onto a transport dolly 1196. The transport dolly 1196 then carries the shell 618 from the transfer station 650 to the trim station 660.

Figure 12:
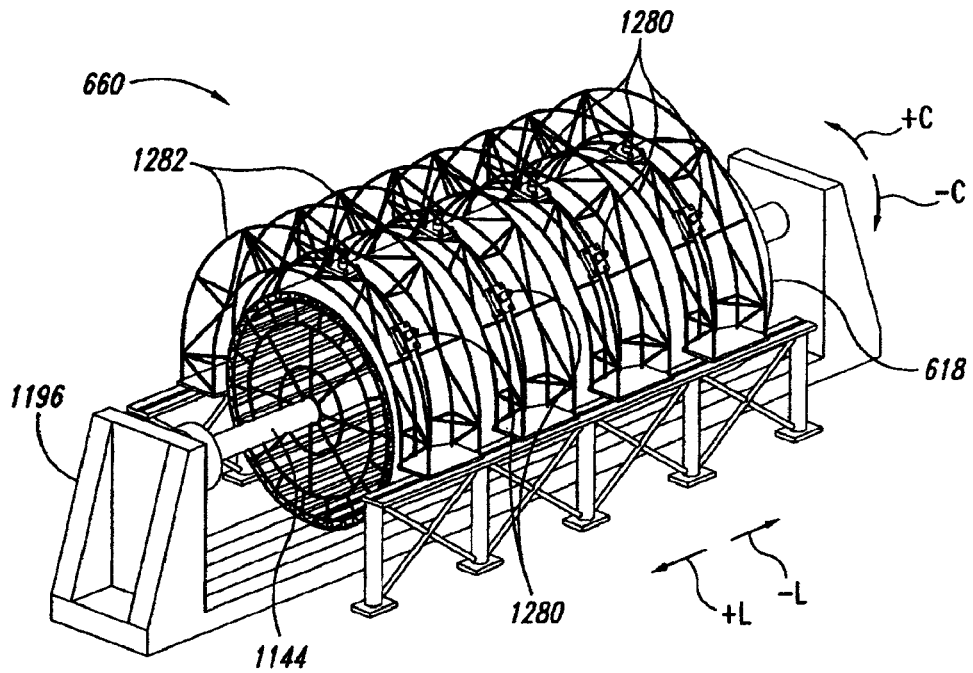
FIG. 12 is an enlarged, partially schematic isometric view of a shell structure parked in a trim station of FIG. 6 in accordance with an embodiment of the invention.

FIG. 12 is an enlarged, partially schematic isometric view of the shell 618 parked in the trim station 660 of FIG. 6. The trim station 660 can include a plurality of arched gantry tracks 1282 which extend over the shell 618 and are movable in the +/−L directions. A plurality of cutting devices 1280 (e.g., numerically controlled drill routers) are mounted to the gantry tracks 1282 and are configured to move back and forth in the circumferential +/−C directions. The cutting devices 1280 can be automatically controlled (by, e.g., an associated computer program) to trim the ends of the shell 618 and provide window cutouts and other apertures according to a preset plan. The header boom 1144 can be rotated in the +/−C directions if needed to facilitate the various trimming operations. After the shell 618 has been fully trimmed, the transport dolly 1196 proceeds to the NDE station 670.

Figure 13:
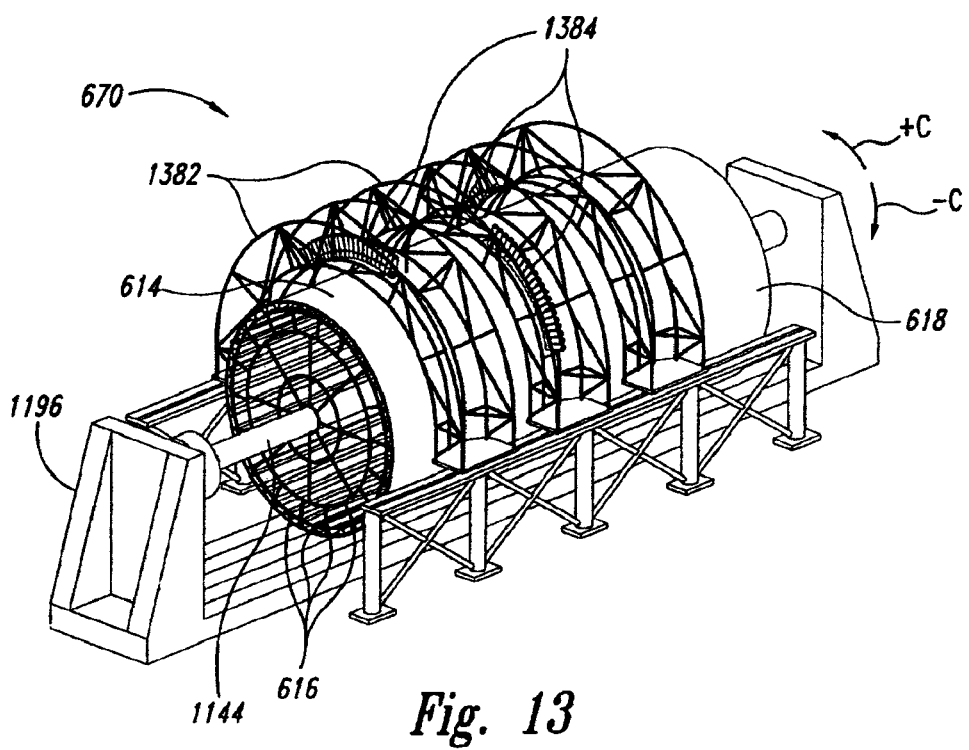
FIG. 13 is an enlarged, partially schematic isometric view of the shell structure parked in a non-destructive evaluation station of FIG. 6 in accordance with another embodiment of the invention.

FIG. 13 is an enlarged, partially schematic isometric view of the shell 618 parked in the NDE station 670 of FIG. 6. The NDE station 670 can include a plurality of arched gantry tracks 1382 that are at least generally similar in structure and function to the gantry tracks 1282 of FIG. 12. In the illustrated embodiment, however, the gantry tracks 1382 can support a plurality of nondestructive test devices 1384 for performing acceptance tests on the shell 618. In one embodiment, for example, the test devices 1384 can include pulse-echo sensors for ultrasonically testing the skin 614 for voids and/or other manufacturing defects. To test the stiffeners 616 on the inside of the skin 614, a separate set of sensors positioned inside the shell 618 may be required. In other embodiments, other devices can be used to assess the structural and/or dimensional integrity of the shell 618. Such devices can include, for example, x-ray, infrared, and laser sensors, as well as various other known test devices.

Once the shell 618 has been fully evaluated, the header boom 1144 is lifted out of the transport dolly 1196 to position the shell 618 in a cradle or other suitable fixture. The headers 1152 can then be retracted inwardly so that the header boom 1144 can be extracted from the shell 618. Final assembly of the shell 618 can then proceed with the installation of frames, floors, doors, windows, and other structures and systems. At some point in the final assembly process, the shell 618 is joined to adjacent fuselage sections form an entire fuselage structure at least generally similar in structure and function to the fuselage 102 shown in FIG. 1.

The subject matter of copending U.S. patent application Ser. Nos. 10/646,509, entitled "MULTIPLE HEAD AUTOMATED COMPOSITE LAMINATING MACHINE FOR THE FABRICATION OF LARGE BARREL SECTION COMPONENTS," filed Aug. 22, 2003; 10/717,030, entitled "METHOD OF TRANSFERRING LARGE UNCURED COMPOSITE LAMINATES," filed Nov. 18, 2003; 10/646,392, entitled "AUTOMATED COMPOSITE LAY-UP TO AN INTERNAL FUSELAGE MANDREL," filed Aug. 22, 2003; 10/630,594, entitled "COMPOSITE FUSELAGE MACHINE," filed Jul. 28, 2003; 10/646,316, entitled "UNIDIRECTIONAL, MULTI-HEAD FIBER PLACEMENT," filed Aug. 22, 2003; 10/301,949, entitled "PARALLEL CONFIGURATION COMPOSITE MATERIAL FABRICATOR," filed Nov. 22, 2002; 10/799,306, entitled "SYSTEMS AND METHODS ENABLING AUTOMATED RETURN TO AND/OR REPAIR OF DEFECTS WITH A MATERIAL PLACEMENT MACHINE," filed Mar. 12, 2004; 10/726,099, entitled "SYSTEMS AND METHODS FOR DETERMINING DEFECT CHARACTERISTICS OF A COMPOSITE STRUCTURE," filed Dec. 2, 2003; 10/628,691, entitled "SYSTEMS AND METHODS FOR IDENTIFYING FOREIGN OBJECTS AND DEBRIS (FOD) AND DEFECTS DURING FABRICATION OF A COMPOSITE STRUCTURE," filed Jul. 28, 2003; and 10/822,538, entitled "SYSTEMS AND METHODS FOR USING LIGHT TO INDICATE DEFECT LOCATIONS ON A COMPOSITE STRUCTURE, filed Apr. 12, 2004, is incorporated by reference. In addition, the subject matter of U.S. Pat. No. 6,168,358 is also incorporated by reference.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

We claim:

1. A method for positioning vacuum bag material over a composite lay-up on a tool surface extending 360 degrees around an axis, the method comprising:

positioning a first portion of vacuum bag material over a first portion of the composite lay-up;

creating a first seal between a first edge of the first portion of vacuum bag material and the composite lay-up;

positioning a second portion of vacuum bag material over a second portion of the composite lay-up;

creating a second seal between a second edge of the second portion of vacuum bag material and the composite lay-up; and sealing a third edge region of the first portion of vacuum bag material to a fourth edge of the second portion of vacuum bag material.

2. The method of claim 1, further comprising:

positioning a third portion of vacuum bag material over a third portion of the composite lay-up;

sealing a fifth edge of the third portion of vacuum bag material to a second edge of the second portion of vacuum bag material; and sealing a sixth edge region of the third portion of vacuum bag material to at least one of the first edge of the first portion of vacuum bag material and an eighth edge of a fourth portion of vacuum bag material.

3. The method of claim 1, further comprising:

creating a third seal between the third edge of the first portion of vacuum bag material and the composite lay-up;

sealing a ninth edge and a tenth edge of the first portion of vacuum bag material to the tool; and evacuating a volume beneath the first portion of vacuum bag material.

4. The method of claim 3, further comprising positioning a stiffener placement tool over a first set of stiffeners located beneath the first portion of vacuum bag material; and extending actuators of the stiffener placement tool to hold the first set of stiffeners in place.

5. The method of claim 1, further comprising:

releasing the second seal.

6. The method of claim 1, further comprising:

positioning a plurality of vacuum strips on the composite lay-up; and wherein creating the first seal comprises evacuating a first chamber of a first vacuum strip in the plurality of vacuum strips.

7. The method of claim 5, further comprising:

positioning a plurality of vacuum strips on the composite lay-up; and wherein releasing the second seal comprises releasing a vacuum in a second chamber of a second vacuum strip in the plurality of vacuum strips.

8. The method of claim 1, further comprising:

positioning a release film over the first portion of the composite lay-up.

9. The method of claim 1, wherein the tool surface comprises an interior mold surface of a female tool and, further comprising:

inserting a vacuum bag material dispenser into the female tool.

10. The method of claim 6, further comprising removing the plurality of vacuum strips from the composite lay-up.

* * * * *